United States Patent
Chen

(10) Patent No.: US 11,237,299 B2
(45) Date of Patent: Feb. 1, 2022

(54) SELF-LEARNING NOWCAST SYSTEM FOR MODELING, RECORDING, AND PREDICTING CONVECTIVE WEATHER

(71) Applicant: I.M. Systems Group, Inc., Rockville, MD (US)

(72) Inventor: Ruiyue Chen, Fall Church, VA (US)

(73) Assignee: I.M. Systems Group, Inc., Rockville, MD (US)

( * ) Notice: Subject to any disclaimer, the term of this patent is extended or adjusted under 35 U.S.C. 154(b) by 578 days.

(21) Appl. No.: 15/966,633

(22) Filed: Apr. 30, 2018

(65) Prior Publication Data
US 2018/0313975 A1   Nov. 1, 2018

Related U.S. Application Data

(60) Provisional application No. 62/492,729, filed on May 1, 2017.

(51) Int. Cl.
*G01W 1/10* (2006.01)
*G06K 9/00* (2006.01)
(Continued)

(52) U.S. Cl.
CPC ............ *G01W 1/10* (2013.01); *G06F 16/29* (2019.01); *G06F 16/5866* (2019.01);
(Continued)

(58) Field of Classification Search
CPC ............ G01W 1/10; G01W 2001/006; G01W 2203/00; G06F 16/5866; G06F 16/29; G06F 3/04845; G06K 9/0063; G06N 20/00
See application file for complete search history.

(56) References Cited

U.S. PATENT DOCUMENTS 7,542,852 B1   6/2009 Rose et al.
8,818,029 B1   8/2014 Mecikalski et al.
(Continued)

FOREIGN PATENT DOCUMENTS

CN   112287838   *   1/2021   ........... G06K 9/6267

OTHER PUBLICATIONS

J. Williams et al., "J1.4 A machine learning approach to finding weather regimes and skillful predictor combinations for shortterm storm forecasting", Sixth Conference on Artificial Intelligence Applications to Environmental Science 13th Conference on Aviation, Range and Aerospace Meteorology 2008 (Year: 2008).*

(Continued)

*Primary Examiner* — Regis J Betsch
(74) *Attorney, Agent, or Firm* — Arnold & Porter Kaye Scholer LLP

(57) ABSTRACT

The systems, methods, and apparatuses described herein provide integrated weather forecast products designed to assist operations managers with operational decision-making related to a designated event or set of events. The present disclosure provides a way to process weather data from various sources and in diverse data formats containing varying spatial resolutions and temporal resolutions, in order to generate an integrated and cohesive weather projection product such that the weather projection product is continuous in both spatial and temporal domains relative to a designated event or set of events.

38 Claims, 10 Drawing Sheets

(51) Int. Cl.
*G06F 3/0484* (2013.01)
*G01W 1/00* (2006.01)
*G06F 16/29* (2019.01)
*G06F 16/58* (2019.01)
*G06N 20/00* (2019.01)

(52) U.S. Cl.
CPC ..... *G06K 9/0063* (2013.01); *G01W 2001/006* (2013.01); *G01W 2203/00* (2013.01); *G06F 3/04845* (2013.01); *G06N 20/00* (2019.01)

(56) References Cited

U.S. PATENT DOCUMENTS

| | | |
|---|---|---|
| 9,171,473 B1 | 10/2015 | McNally et al. |
| 9,558,670 B1 | 1/2017 | Sheth et al. |
| 2003/0156734 A1 | 8/2003 | Wolfson et al. |
| 2013/0024118 A1 | 1/2013 | Gershunov et al. |
| 2013/0156734 A1 | 6/2013 | Testi et al. |
| 2015/0161150 A1 | 6/2015 | Goering et al. |
| 2015/0278596 A1 | 10/2015 | Kilty et al. |
| 2016/0356922 A1* | 12/2016 | Mccann ............... G01W 1/00 |
| 2018/0038994 A1* | 2/2018 | Hamann ............... G01W 1/10 |

OTHER PUBLICATIONS

Conway et al., "Weather Forecasting by Interactive Analysis of Radar and Satellite Imagery", Philosophical Transactions of the Royal Society of London. Series A, Mathematical and Physical Sciences, Mar. 31, 1988, vol. 324, No. 1579 (Year: 1988).*

Shi et al., "Convolutional LSTM Network: A Machine Learning Approach for Precipitation Nowcasting", Proceedings of the 28th International Conference on Neural Information Processing Systems—vol. 1Dec. 2015 pp. 802-810 (Year: 2015).*

International Search Report dated Jul. 9, 2018 issued in PCT/US2018/030378.

* cited by examiner

SELF-LEARNING NOWCAST SYSTEM FOR MODELING, RECORDING, AND PREDICTING CONVECTIVE WEATHER

CROSS-REFERENCE TO RELATED APPLICATIONS

This non-provisional patent application claims priority to U.S. Provisional Patent 62/492,729, entitled "Self-Learning Nowcasting System For Modeling, Recording, And Predicting Convective Weather," filed May 1, 2017, which is incorporated by reference herein in its entirety.

FIELD OF THE DISCLOSURE

The systems, methods, and apparatuses described herein relate to an integrated weather nowcasting system designed to assist with operational decision-making related to a designated event or set of events.

BACKGROUND

Weather can impact the safety, efficiency, and capacity of operations of many businesses. In some cases, weather conditions may require that a business stop operations altogether, leading to detrimental economic impacts on that business, customer dissatisfaction, and other such unwelcome consequences. Weather projection products designed to assist with operational decision-making can be particularly helpful to a business whose operations may be affected by weather conditions. Affected businesses can similarly benefit from decision-making support tools that include as inputs weather projection products covering broad spatial ranges and temporal ranges, thus facilitating both proactive and reactive operations management and minimizing the weather's adverse effects on businesses utilizing such tools.

A variety of weather projection products currently exist to deliver to operations managers the weather information appropriate for strategic and tactical stages of operational decision-making. For instance, weather forecasting products typically rely on physics-based numerical modeling of the interactions among various physical processes in the atmosphere and between land surface and the atmosphere. Such physics-based models usually assume initial and boundary conditions for atmospheric layers and solve in the time domain differential and partial differential fluid dynamics equations representing such physical processes. Physics-based models usually conduct data assimilation, which is a numerical process that combines a model forecast field with the available weather observation at the current time step; minimizes the difference between the forecast and such observation; and adjusts the model forecast trajectory in order to improve the forecast model at future time steps at such time intervals so as to achieve optimal results of future predicted atmospheric states, i.e., weather forecasts.

In contrast, weather nowcasting products are generally based on the tracking and extrapolation of weather features observed by weather radar and satellites that, in most cases, are persistent and continuous in short range time and space. By employing efficient image processing and statistical techniques in lieu of the physics-based equations used in weather forecasting, weather nowcasting is able to generate short term weather projections, e.g., for two hours into the future or less, and provide weather projection updates at very high frequencies, as little as every few minutes. Weather prediction updates at such rates are not presently possible with weather forecasting techniques because calculating and processing data using physics-based modelling is computationally taxing and therefore too time consuming. However, because weather forecasting techniques are physics-based, they can generate weather projections further into the future than can weather nowcasting techniques.

As an illustrative example, air traffic management and control ("ATM/C") personnel require weather information with varying spatial and temporal scopes throughout various ATM/C stages—such as flight planning, takeoff sequencing, tower control during taxiing and takeoff, terminal radar approaching control during aircraft ascent and descent, and en route area traffic control during cruising—to achieve and maintain safety, operational efficiency, and air space capacity in ATM/C.

Normally, at the strategic planning stage, e.g., more than two hours before a scheduled flight, ATM/C decision-making depends on weather forecasts for preparing and adjusting flight plans. During the strategic stage, ATM/C personnel with access to relevant weather information have the capability to manage air traffic proactively by generating re-routing plans to circumvent weather-blocked airspace, or by executing ground delay programs or ground stop programs to prevent burdening the reduced airspace capacity. Strategic ATM/C ground delay programs and ground stop programs offer improved operational aviation safety, balanced airspace demand and capacity, and reduced aviation fuel burning.

At the tactical stage, e.g., within two hours of a scheduled flight, ATM/C decision-making depends on real-time weather observation and "nowcasting," i.e., very short term weather projections. During the tactical stage, ATM/C decision-making tends to be reactive and can involve such ATM/C mechanisms as airborne holding until adverse weather impact has passed, or diverting to alternative airports aircraft that have encountered adverse weather and have fuel levels that limit their airborne time.

There are various weather nowcasting products are available on the market currently. These nowcasting products analyze weather data from consecutive weather observation images to estimates the motion of weather system and thus forecast its position in the near future. Usually data from single platforms are used for such motion analysis and the forecast easily fail if there is significant data instability. Meanwhile, most nowcasting product only forecast the position of weather system through conventional extrapolation technologies and assume the system intensity keep unchanged in a couple of hours. In reality, weather system such as convection could evolves rapidly within a couple of hour, however, the conventional nowcasting technology merely extrapolate information from weather observation image data and cannot predict the growth and decay of storm systems quantitatively in real-time or in the near-term. Thus, a weather nowcasting product that predicts both location and intensity evolution is urgently needed for weather-affected operations such as ATM/C.

As discussed above, there are significant disadvantages associated with currently available weather nowcasting products; no such currently available products equip businesses to adequately manage their operations in a safe and efficient manner in the face of weather conditions that could otherwise undermine operational execution.

What is needed are systems and methods that may generate nowcasting data quantitatively showing the growth and decay for storm systems in real-time. What is also needed are systems and methods that may generate predictive nowcasting data for the predicted growth and decay of storm systems in a near-term timeframe. This data may be provided to graphical user interfaces (GUIs) or other software processes that may interpret or otherwise apply the generated nowcasting data.

SUMMARY

Disclosed herein are systems and methods intended to address the shortcomings in the art described above, and may provide additional or alternative benefits as well. The systems may generate nowcasting data quantitatively predicting the growth and decay of storm systems, both in real-time and in the near-term future (e.g., 0-2 hours).

In some embodiments, a computer-implemented method for automated modeling, recording, and predicting convective weather, the method comprises receiving, by a computer, one or more weather data images from one or more image data sources for one or more time step intervals; identifying, by the computer, at a first time step a new convection object in a weather data image based upon one or more parameters associated with the convective object; generating, by the computer, a new convection object data record in an evolution database, the new convection object data record associated with the new convection object; storing, by the computer, into the new convection object data record and one or more parameters associated with the new convective object for each respective time step after the first time step; generating, by the computer, a nowcast output based upon the weather object data record received for the one or more time step intervals of the new convective object and based upon one or more convective object data records for one or more convective objects, wherein the nowcast output is configured to display on a graphical user interface (GUI) a geographic map indicating a nowcast weather image for a set of one or more future time step intervals; and transmitting, by the computer, the nowcast output to one or more user devices configured to display the nowcast output via the GUI.

In some aspects such embodiments, the nowcast output is further based upon one or more convection object data records stored in an evolution database.

In some aspects such embodiments, the method further comprises identifying the one or more convection object data records in the evolution database based upon at least one of a geographic parameter and temporal parameters, wherein a geographic parameter indicates a geographic location of a convection object of a data record, and wherein a temporal parameter indicates a time of a convection object of a data record.

In some aspects such embodiments, wherein storing the new convection object data record in the evolution database further comprises updating, by the computer, a nowcasting algorithm configured to generate a predictive nowcast for the set of one or more future time step intervals of the nowcast output based upon the new convection object data record and at least one convection object data record in the evolution database.

In some aspects such embodiments, the method further comprises receiving, by the computer, weather observation data from one or more data sources, wherein the computer identifies the new convective object based further upon the weather observation data.

In some aspects such embodiments, the method further comprises receiving, by the computer, weather observation data from one or more data sources, wherein the computer stores weather observation data into the new convection object data record.

In some aspects such embodiments, the method further comprising receiving, by the computer, weather observation data from one or more data sources, wherein the computer generates the nowcast output further based upon the weather observation data.

In some aspects such embodiments, wherein the nowcast output is at least one of a machine-readable computer file and a machine-readable data stream.

In some aspects such embodiments, the method further comprising storing, by the computer, into a database weather observation data and weather image data received from one or more data sources.

In some aspects such embodiments, the method further comprising converting, by the computer, the weather observation data and the weather image data from the data sources into a format compatible with the computer.

In some aspects such embodiments, the method further comprising storing, by the computer, into a sub-database a subset of the weather observation data and weather image data based upon a geographic parameter indicating a geographic location associated the sub-database and the subset.

In some aspects such embodiments, wherein the computer generates the nowcast output based upon one or more parameters in weather observation data and weather image data selected from the group comprising: object maximum reflectivity, maximum reflectivity change rate, object area, object area change rate, object coldest BT, coldest BT change rate, and flash statistics.

In some aspects such embodiments, wherein the computer automatically calculates the parameter values for each convection object record during the life span of the new convection object.

In some aspects such embodiments, the method further comprises searching, by the computer, the evolution database to find a historical convection object matched to the new convection object, wherein the computer generates a predictive nowcast portion of the nowcast output, and wherein the predictive nowcast comprises the nowcast weather image for the set of one or more future time step intervals predicting a future motion and intensity of the new convection object.

In some aspects such embodiments, the method further comprises determining an intensity changes of each pixel of a nowcast weather image of the new convection object according to a set of weather object parameters.

In some embodiments, a weather nowcasting system for automated modeling, recording, and predicting convective weather, the system comprises an evolution database comprising non-transitory machine-readable medium configured to store one or more convection object data records; and a processor configured to: receive one or more weather data images from one or more image data sources for one or more time step intervals; identify at a first time step a new convection object in a weather data image based upon one or more parameters associated with the convective object; generate a new convection object data record in the evolution database, the new convection object data record associated with the new convection object; store into the new convection object data record and one or more parameters associated with the new convective object for each respective time step after the first time step; generate a nowcast output based upon the weather object data record received for the one or more time step intervals of the new convective object and based upon one or more convective object data records for one or more convective objects, wherein the nowcast output is configured to display on a graphical user interface (GUI) a geographic map indicating a nowcast weather image for a set of one or more future time step intervals; and transmit the nowcast output to one or more user devices configured to display the nowcast output via the GUI.

In some aspects such embodiments, wherein the nowcast output is further based upon one or more convection object data records stored in an evolution database.

In some aspects such embodiments, wherein the processor is further configured to identify the one or more convection object data records in the evolution database based upon at least one of a geographic parameter and temporal parameters, wherein a geographic parameter indicates a geographic location of a convection object of a data record, and wherein a temporal parameter indicates a time of a convection object of a data record.

In some aspects such embodiments, wherein to store the new convection object data record in the evolution database the processor is further configured to update a nowcasting algorithm configured to generate a predictive nowcast for the set of one or more future time step intervals of the nowcast output based upon the new convection object data record and at least one convection object data record in the evolution database.

In some aspects such embodiments, wherein the processor is further configured to receive weather observation data from one or more data sources, wherein the processor identifies the new convective object based further upon the weather observation data.

In some aspects such embodiments, wherein the processor is further configured to receive weather observation data from one or more data sources, and wherein the processor stores the weather observation data into the new convection object data record.

In some aspects such embodiments, wherein the processor is further configured to receive weather observation data from one or more data sources, wherein the processor generates the nowcast output further based upon the weather observation data.

In some aspects such embodiments, wherein the nowcast output is at least one of a machine-readable computer file and a machine-readable data stream.

In some aspects such embodiments, further comprising a database configured to database weather observation data, wherein the processor is further configured to store weather observation data and weather image data received from one or more data sources into the database.

In some aspects such embodiments, wherein the processor is further configured to convert the weather observation data and the weather image data from the data sources into a format compatible with the processor.

In some aspects such embodiments, further comprising one or more sub-databases configured to subsets of data records of the database, and wherein the processor is further configured to store into a sub-database a subset of the weather observation data and weather image data based upon a geographic parameter indicating a geographic location associated the sub-database and the subset.

In some aspects such embodiments, wherein the processor generates the nowcast output based upon one or more parameters in weather observation data and weather image data selected from the group comprising: object maximum reflectivity, maximum reflectivity change rate, object area, object area change rate, object coldest BT, coldest BT change rate, and flash statistics.

In some aspects such embodiments, wherein the processor automatically calculates the parameter values for each convection object record during the life span of the new convection object.

In some aspects such embodiments, wherein the processor is further configured to search the evolution database to find a historical convection object matched to the new convection object, wherein the processor generates a predictive nowcast portion of the nowcast output, and wherein the predictive nowcast comprises the nowcast weather image for the set of one or more future time step intervals predicting a future motion and intensity of the new convection object.

In some aspects such embodiments, wherein the processor is further configured to determine an intensity changes of each pixel of a nowcast weather image of the new convection object according to a set of weather object parameters.

DETAILED DESCRIPTION

Figure 1A:
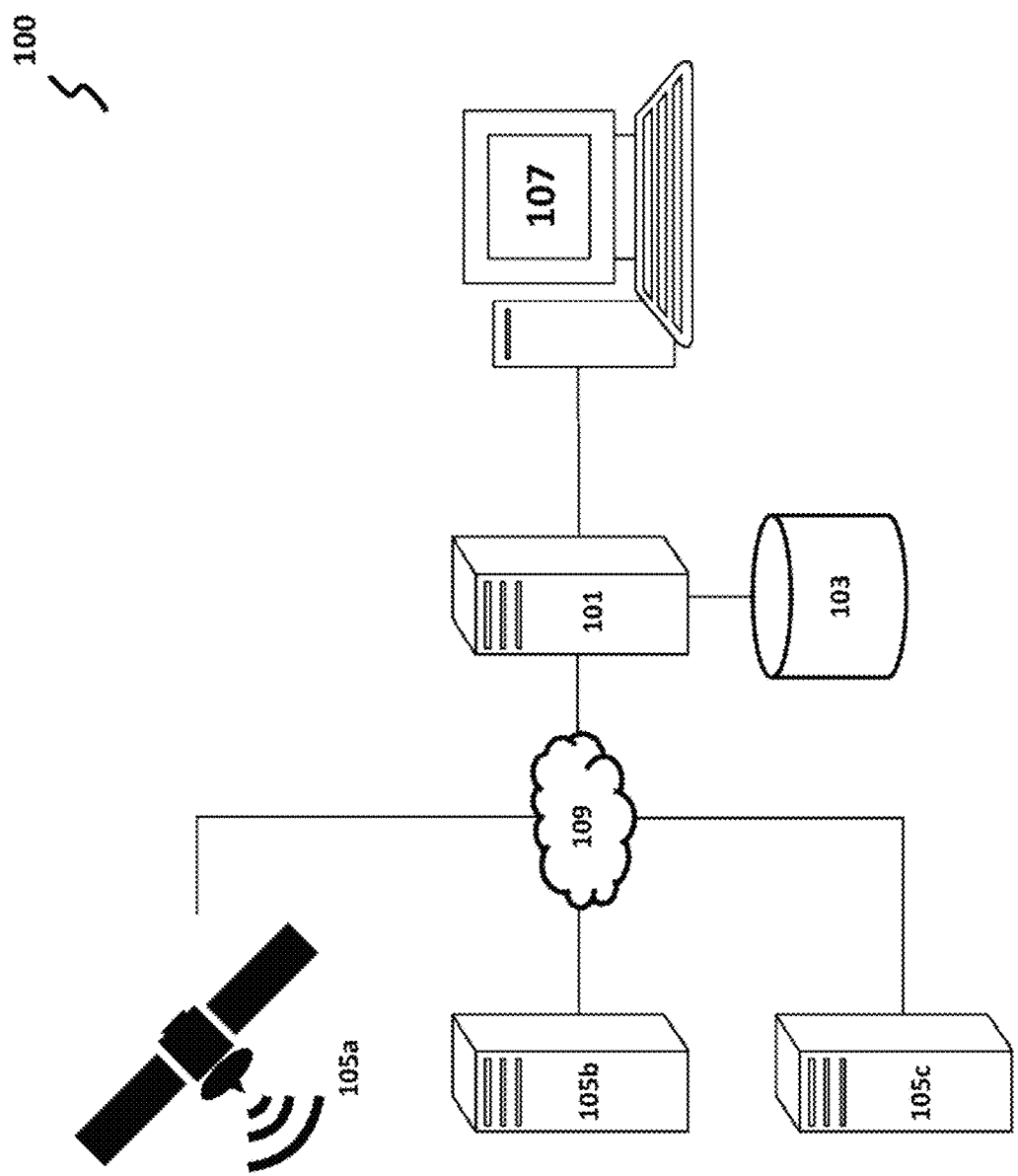
FIG. 1A shows components of a nowcasting system, according to an exemplary embodiment.

Certain illustrative aspects of the systems, apparatuses, and methods according to the present disclosure are described herein in connection with the following description and the accompanying figures. These aspects are indicative, however, of but a few of the various ways in which the principles of the systems, apparatuses, and methods may be employed, and the present disclosure is intended to include all such aspects and their equivalents. Other advantages and novel features of the present disclosure may become apparent from the following detailed description when considered in conjunction with the figures.

In the following detailed description, numerous specific details are set forth in order to provide a thorough understanding of the present disclosure. In other instances, well known structures, interfaces, and processes have not been shown in detail in order not to unnecessarily obscure the systems, apparatuses, and methods according to the present disclosure. However, it will be apparent to one of ordinary skill in the art that those specific details disclosed herein need not be used to practice the systems, apparatuses, and methods according to the present disclosure and do not represent a limitation on the scope thereof, except as recited in the claims. It is intended that no part of this specification be construed to effect a disavowal of any part of the full scope of the present disclosure. Although certain embodiments of the present disclosure are described, these embodiments likewise are not intended to limit the full scope of the systems, apparatuses, and methods according to the present disclosure.

As used herein, the term "weather projection" comprises "weather forecasting" and "weather nowcasting." But where "forecasting" or "weather forecasting" refers to projections of weather conditions beyond a near-term timeframe (e.g. 1-14 days), "nowcasting" or "weather nowcasting" refers to a projection of weather conditions usually within the near-term of a particular time of interest (e.g., 0-2 hours). Notwithstanding the foregoing, one having ordinary skill in the art will understand that these temporal ranges are merely approximations and can be varied as appropriate. In addition, one having skill in the art would appreciate that forecasting technology generally The present disclosure provides systems and methods for generating nowcasting weather projection to assist in operational decision-making related to a designated event or set of events, including a convective object, which may be, for example, one or more convective cells (e.g., one or more storm systems). The present disclosure provides a way to process weather data from various sources and in diverse data formats containing varying spatial resolutions and temporal resolutions in order to generate an integrated and cohesive weather projection product such that the weather projection product is continuous in both spatial and temporal domains, subject to data availability, relative to a designated event or set of events. For example, in some cases, it might be desirable to apply weather projection products to assist with air traffic management and control ("ATM/C"). In such cases, an embodiment of the present disclosure may generate integrated weather projection products that may assist ATM/C personnel with strategic decisions, such as ground delay programs and ground stop programs, and tactical decisions, such as airborne holding or diverting aircraft to alternative airports.

ATM/C systems, like other systems requiring near-immediate and accurate nowcasting data for real-time and near-term prediction, cannot use the numerical model of the forecasting technology because forecasting technology takes too long to generate the results and produces lower quality resolution. This is due to the techniques deployed in forecasting technologies, which uses aerodynamic-related models. The lower accuracy and longer turnaround time for forecasting results is acceptable in the typical forecasting applications: creating a general idea of weather several days into the future. The nowcasting system and methods described herein provide more immediate and more accurate data. Generally, this is accomplished by processing the image pixels of multiple types of real-time weather images (e.g., radar, satellite brightness, flash images) along with historic image data and/or other weather-related observation data.

The systems and methods described herein may generate real-time nowcasting weather data and near-term (e.g., 0-2 hours) predictive nowcasting weather data, which may include convective weather nowcasting data for air traffic management, among other applications. The numerical modeling of forecasting technology cannot provide forecasting data outputs quickly enough, with sufficient spatial/temporal resolution and required accuracy, for many applications, like air traffic management. Conventional nowcasting technology of convective weather usually depends on the extrapolation of radar or satellite convective weather observations (e.g., satellite imagery processing). Previously, many studies have successfully explored the estimation of storm advection (e.g., speed and direction) by comparing the storm location in current image with that in previous images. However, the prediction of convective intensity (e.g., radar reflectivity) change is still a challenge, mainly because the information in the previous and current observation images is not enough to predict storm intensity changes in the next few hours (e.g., 1-12 hours). In order to get enough information to make a complete and quantitative prediction of convective evolution, including both advection and intensity changes, the nowcasting system described herein comprises databases that receives and stores comprehensive information of convective weather across the life span of any number of storm systems, at any number of geographic locations. The nowcasting system may mathematically model the convective weather evolution of a present storm system using currently available data and the weather data stored in the database, and then predicts the evolution of the current storm system and future storm systems using a self-learning method from the automatically updated database.

Exemplary System Components

FIG. 1A shows components of a nowcasting system 100, according to an exemplary embodiment. The exemplary system 100 comprises a nowcasting server 101, a database 103, source devices 105, and a user computer 107. In operation, the source devices 105 may collect or store weather data that the source devices 105 transmit via one or more networks 109 to a server 101. The server 101 may store the inbound weather data into database 103 that the server 101 may later reference to generate nowcasting weather data. The server 101 may provide the nowcasting weather data to a user device 107 configured to present the nowcasting weather data on a graphical user interface (GUI) that allows a user to review, manipulate, and otherwise interact with the underlying nowcasting weather data. In addition, the server 101 may update the existing nowcasting weather data stored in the database 103 to include the recently generated nowcasting weather data generated by the server 101.

A nowcasting server 101 may generate real-time and near-term nowcasting weather data using weather data received from one or more data sources 105 and a database 103, and may transfer the data to a user device 107. The server 101 may be any computing device comprising non-transitory machine-readable storage and a processor, and capable of performing the various tasks and processes described herein. The nowcasting server 101 may receive weather data, such as images or other weather-related data, from any number of real-time data sources 105, which may be stored in records of the database 103. In some instances, the data received from the data sources 105 may be satellite imagery data from a satellite data source 105a; and in some cases, the data may be radar imagery data from a radar data source 105b or any other weather imagery data (e.g., lightning flash detection, rain gauge, wind speeds) from other data sources 105. The server 101 may generate real-time nowcasting weather data based on the data received from the data sources 105, and the server 101 may generate near-term, predictive, nowcasting weather data. The server 101 may provide the nowcating weather data to a user device 107, which may present the data to a user via a GUI. In operation, the server may 101 detect the formation and dissipation of convection objects (e.g., storm systems) based on the incoming data. Upon detecting the dissipation of a convection object, the server 101 may generate new data records for the region that the convection object occurred and update the database 103 records for the particular region to include the new data of the recently identified convection object.

A database 103 may store and query weather data records according to data records and instructions received from the server 101. The database 103 may be hosted on one or more computing devices comprising a processor and non-transitory machine-readable storage, and capable of performing the various tasks and processes described herein. The weather data records of the database 103 may comprise any number of data fields for weather observation data and/or image data. Each record may contain one or more geolocation data fields, such as latitude and longitude data, or other geolocation data. The server 101 may use the geolocation data fields to identify historic data records that match the geolocation data of a currently tracked convection object. When updating the database 103, the server 101 may associate new records of a particular geolocation based on the geolocation data fields of a recently tracked convection object.

Data sources 105 may be any computing device capable of generating weather observation data and/or imagery data and provide the data to the server 101. Traditionally, convective nowcasting technology depends on either radar observation or satellite observation. The server 101 of the exemplary system 100 uses convective data from a plurality of observation data sources to generate real-time and near-term nowcasting data. Non-limiting examples of such data sources 105 may include satellite imagery related data 105*a*, radar imagery related data 105*b*, or any other device or system that generates real-time weather observation data 105*c*.

A person having skill in the art would appreciate that the data generated from each data source may be in generated in a machine-readable format (e.g., computer files, data stream) that may be stored in a non-transitory machine-readable medium and transmitted via one or more networks 109 to various computing devices, such as a server 101. For example, a radar imagery data source 105*b* may have a radar device that generates weather-related data using radar imagery, which may be digitized by one or more computing devices into machine-readable radar imagery data using any number of well-known image conversion techniques that convert the radar imagery to a digitized format. The radar imagery data source 105*b* may also have one or more computing devices that, in addition to converting and/or digitizing the radar imagery into a machine-readable digital format, may store, and transmit the imagery data to receiving computing devices, such as the server 101 of the nowcasting system 100. One having skill in the art would appreciate that data sources 105 of any type may have one or more computing devices that convert each particular type of weather imagery (e.g., satellite imagery, radar imagery) or other form of weather observation inputs (e.g., rain gauge, wind speeds, lightening flash) into a data format that is compatible with a server 101.

A user device 107 may execute software applications that present a GUI on a screen of the user device, where the GUI may display nowcasting weather data and allows users to interact with the underlying nowcasting weather data. In some cases, the software application may be associated with and published by the nowcasting system 100; and, in some cases, the software applications may be third-party software applications configured to exchange data with the server 101, such that the third-party software application is compatible with the system 100. One having skill in the art would appreciate that the user device 107 may be any computing device comprising a processor and non-transitory machine-readable storage, and capable of performing the various tasks and processes described herein. In operation, the GUI of the user device 107 may present to a user, such as an air traffic controller, various visualizations of weather data, as well as air traffic information received from third-party air traffic data. In some cases, the GUI may overlay the variety of weather data visualizations, such as the nowcasting visualizations described herein, with visualizations of the air traffic in real-time. The GUI may also receive various inputs from the user through any number of known device control input devices (e.g., mouse, keyboard, touchscreen) that allow the user to manipulate the display the view on the GUI, such as changing a zoom, re-size, resolution, portion of image visualization (e.g., moving the visualized area displayed), and which data (e.g., visualized air traffic overlay; visualized satellite imagery data overlay; visualized radar imagery data overlay; visualized weather data observation data; visualized nowcasting overlay) is visualized on the GUI.

Figure 1B:
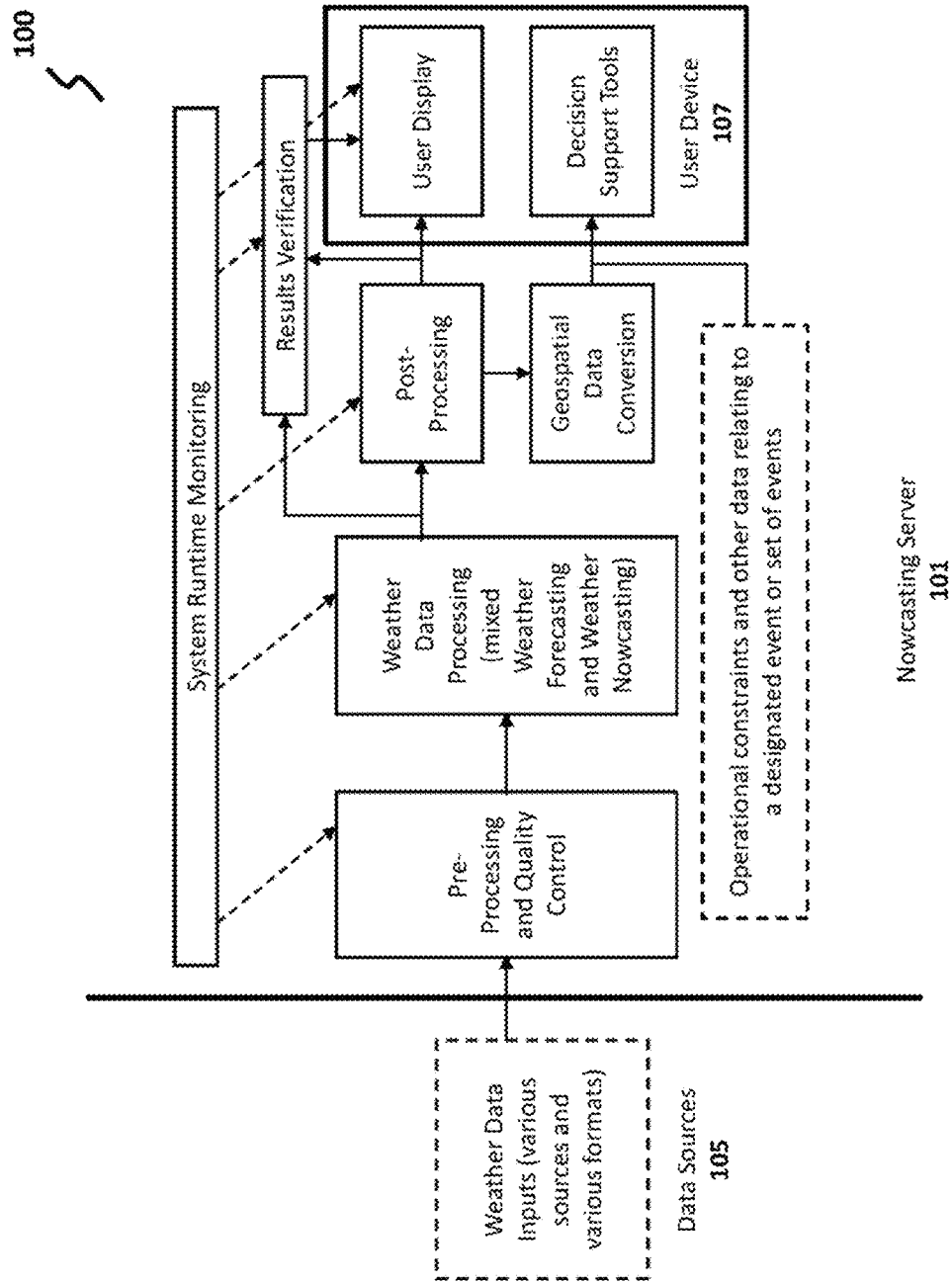
FIG. 1B shows components of a nowcasting system, according to an exemplary embodiment.

FIG. 1B is a block diagram showing components of a nowcasting system 100 according to an exemplary embodiment. In general, data processing for generating weather nowcasting data may involve some or all of the following data, operational components, and computer-executed processes: input of weather data to a nowcasting server 101 via one or more networks 109 from one or more data source devices 105; pre-processing and quality control of inputted data by the server 101; application of weather nowcasting algorithms and/or nowcasting models by the nowcasting server 101 to generate a nowcast weather projection as appropriate for the particular weather data inputs received from the data sources 105; execute data post-processing routines by the server 101 that may, for example, convert physical variables or weather observation data inputs used for a weather projection model into weather projection fields comprising, but not limited to, turbulence and atmospheric freezing level; results verification by the nowcasting server 101 to verify the accuracy and reliability of each such weather projection output against observation data, subject to a pre-defined set of accuracy and reliability parameters stored in the server 101; and integrating one or more weather projection data fields by the server 101 to generate a nowcasting weather projection product output, which the server 101 may transmit to one or more user devices 107 for presentation on GUIs. In some implementations, the nowcasting server 101 may generate the nowcasting weather project output based upon a user-selected or otherwise predetermined spatial range and temporal range in relation to a designated event (e.g., identify convection object). One having skill in the art would appreciate that examples of physical variables or weather observation data inputs may include, but are not limited to, wind speed, temperature, and humidity, as well as each nowcast weather projection output's radar returns.

In some implementations, the nowcasting server 101 may preform results verification, which may involve comparing physical variable parameters of a nowcast weather projection model, which may include weather observation data points including, but not limited to, wind, temperature, dew point temperature, and pressure with ground-based sensor observations measuring surface wind, temperature, dew point, or pressure or soundings measuring atmospheric wind, temperature, or dew point profile from the surface to the top of the troposphere. Results verification may also involve comparing a weather projection model's radar reflectivity or echo top with radar observed reflectivity or echo top. A system runtime monitoring routine, which may be a computer software program executed by any device of the system 100 (e.g., nowcasting server 101, user device 107), may overlay all the processing steps and monitor the system workflow in real-time on the computing platform. The device executing the system runtime monitoring routine, such as the nowcasting server 101, may automatically generate logs and alert runtime issues, which may be stored into a non-transitory machine-readable memory off a device, such as the nowcasting server 101, database 103, user device 107, or any other non-transitory machine-readable medium of the system 100.

Figure 1C:
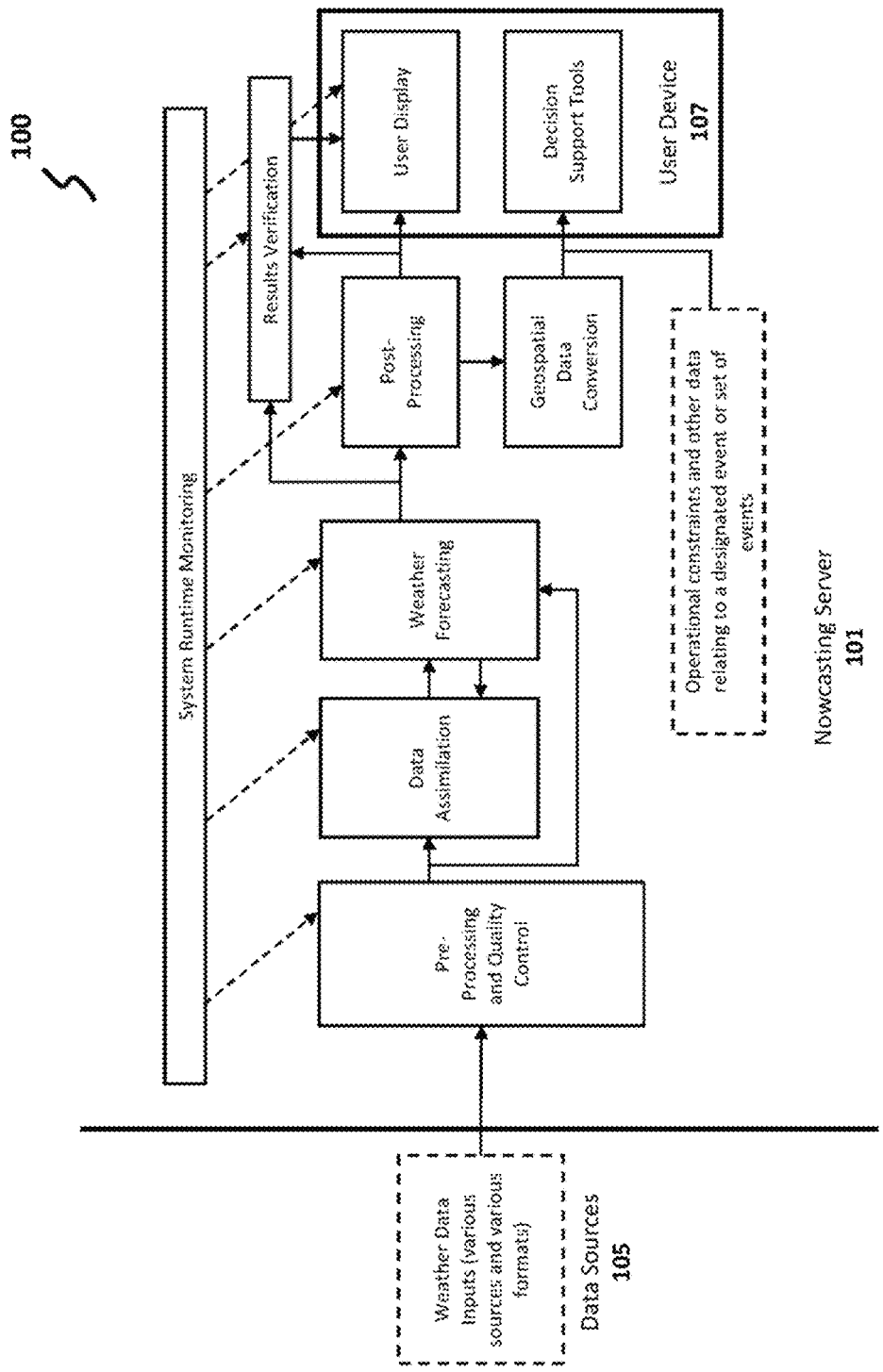
FIG. 1C shows components of a nowcasting system, according to an exemplary embodiment.
Figure 1D:
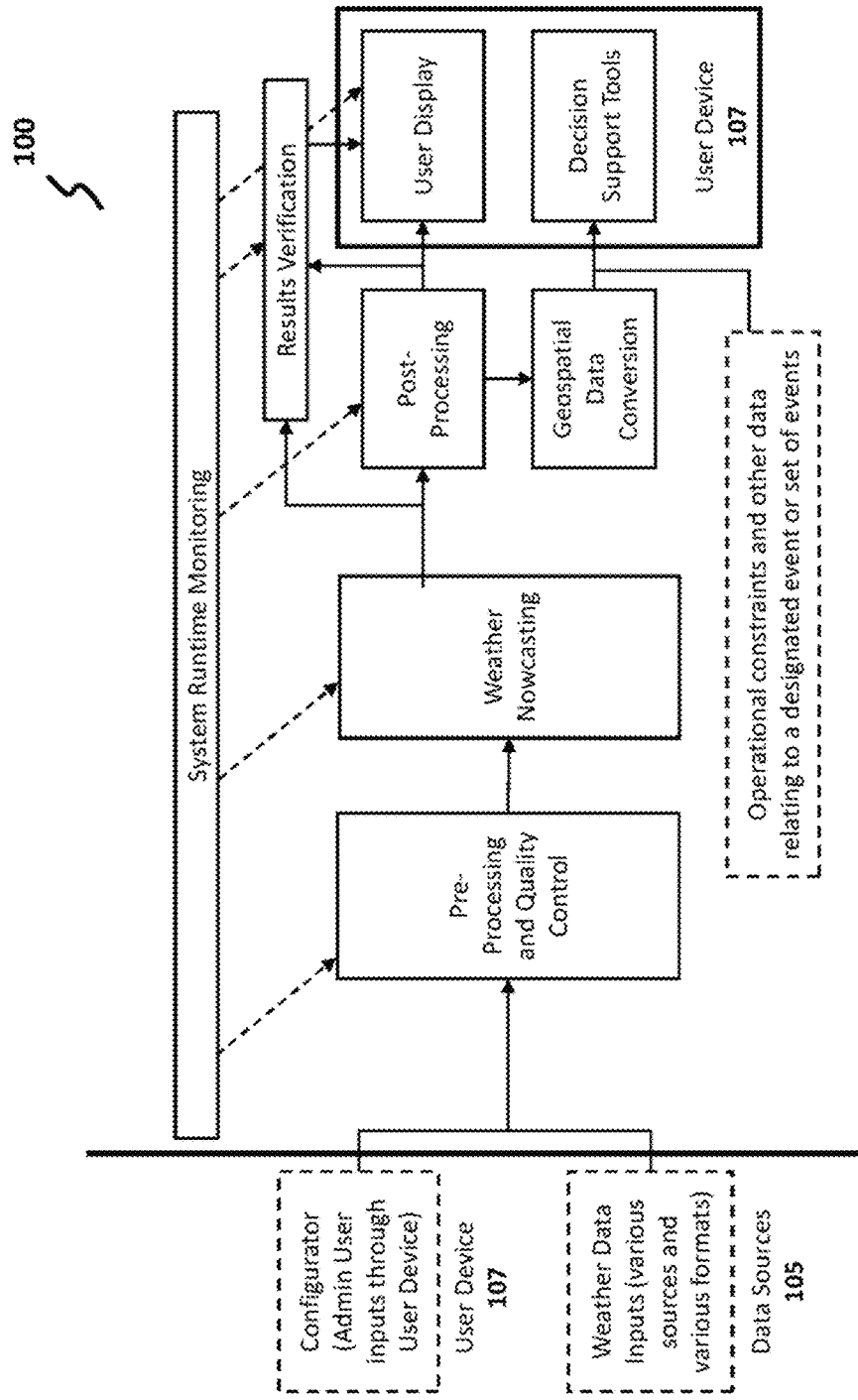
FIG. 1D shows components of a nowcasting system, according to an exemplary embodiment.

In some embodiments, the nowcasting server 101, or other device of the system 100, may be configured to identify and apply data management and conversion techniques appropriate for processing particular weather data inputs from disparate data source devices 105 in order for the server 101 to ingest the data and generate nowcast weather projection products. For example, depending on the data format, as well as the spatial scope and temporal scope of the data, such weather data may undergo a combination of weather forecasting and weather nowcasting techniques. For instance, depending on the data format, as well as the spatial scope and temporal scope of the data, such weather data may undergo a combination of weather forecasting processes, as shown in FIG. 1C, and weather nowcasting processes, as shown in FIG. 1D.

Turning back to FIG. 1B, a nowcasting server 101 may, in some embodiments, receive weather data inputs from data sources 105 having weather observation data types based on quality, spatial resolution, and temporal resolution, in relation to a user's spatial range and temporal range to a designated event or set of events, such as, but not limited to, scheduled flights at an airport. For instance, in some cases, a user device 107 may configure the server 101 such that weather data inputs do not contain data redundancy. As a user's spatial range and temporal range to the designated event or set of events increases or decreases, the weather data inputs appropriate in quality, as well as spatial and temporal resolution, for generating weather projection products for such spatial range and temporal range may also change. Accordingly, the server 101 may be configured to adjust the weather data the system 100 may receive from data sources 105, such that the weather data remains appropriate for a user's spatial range and temporal range.

For example, the system 100 may be used in ATM/C implementation, where data sources 105 provide to the nowcasting server 101 weather data inputs that may include, without limitation, all or a subset of the following: atmospheric sounding observations, such as vertical atmospheric profiles of weather variables (e.g., temperature, dew point, pressure, wind speed); wind profiler observations; geostationary weather satellite infrared channels and polar-orbiting (low earth orbit) weather satellite infrared and microwave channels for atmospheric temperature profile and water vapor estimation; ground-based Doppler weather single-radar or multi-radar mosaic data and products; ground observations, including routine surface automatic weather observation stations, and other ground surface in situ observations of weather variables, which may be cloud ceiling and visibility measurements; runway visual range information; anemometer data; Light Detection and Ranging (LIDAR) data; large domain numerical weather processing model forecast results; other national and internationally available numerical weather prediction model outputs; data from other specialized sensors measuring cloud ceiling, visibility, and airport runway snow and icing accumulation; aircraft observations; static or time varying ancillary data that characterizes land surface and/or atmospheric lower and upper boundaries; and analytical data products combining model outputs with ground observations that are generated by operational weather forecast centers.

Figure 1E:
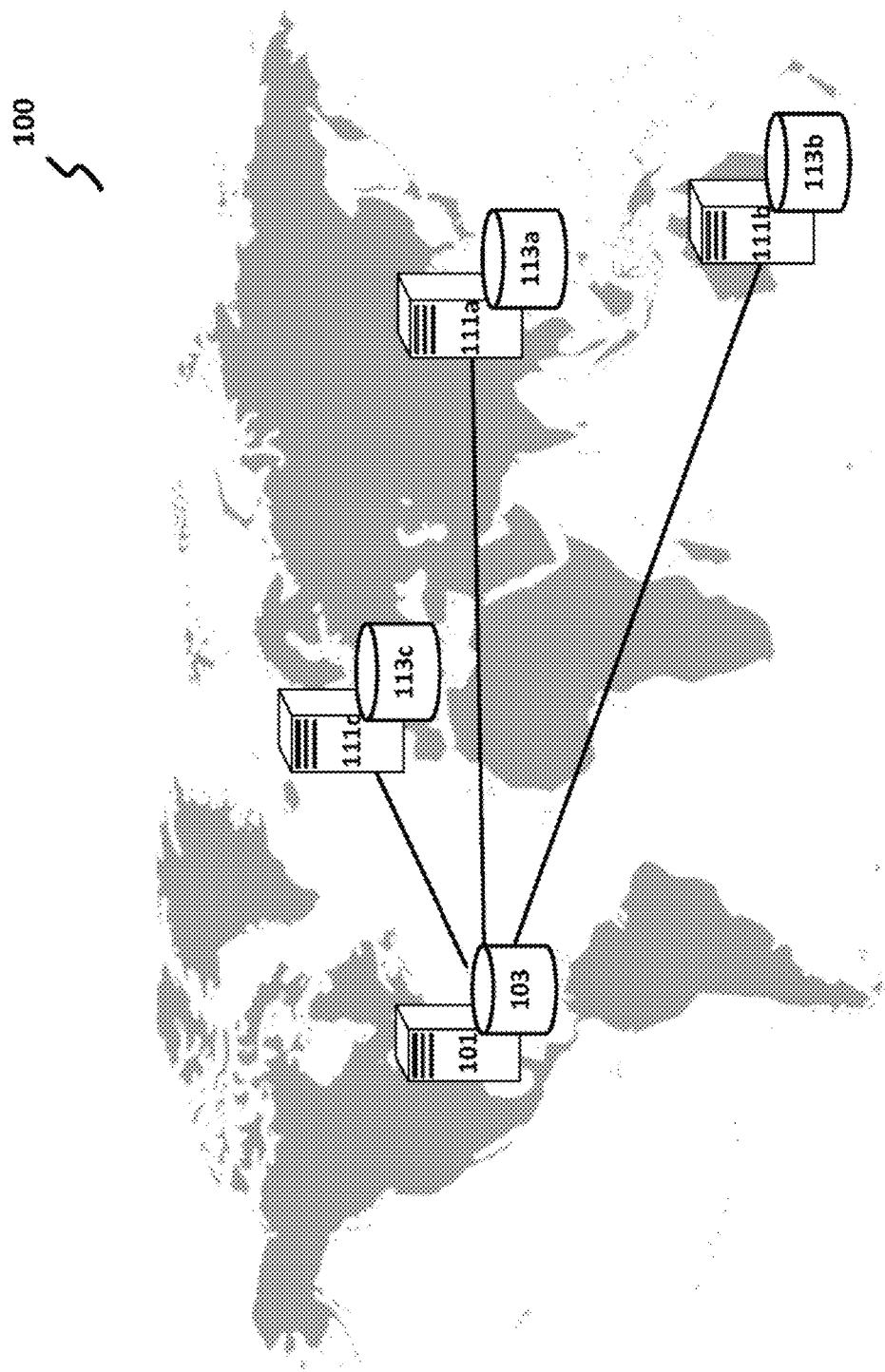
FIG. 1E shows components of a nowcasting system, according to an exemplary embodiment.
Figure 1F:
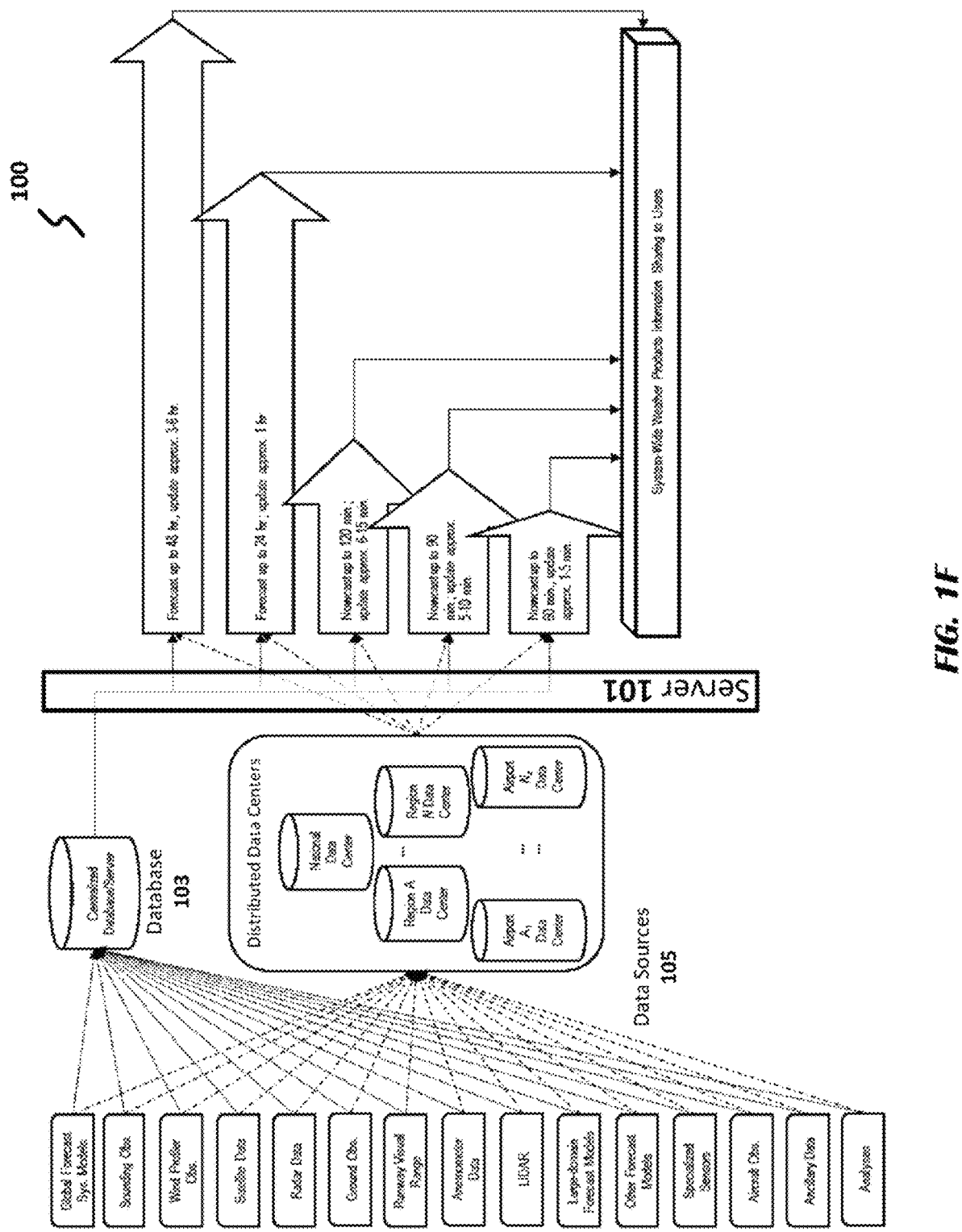
FIG. 1F shows components of a nowcasting system, according to an exemplary embodiment.

In some embodiments, the system 100 may implement a customized data input strategy, depending on the existing and evolving data infrastructure available to a server 101 and/or available to a user device 107 of the system 100. For example, a region or nation may have a sophisticated data infrastructure such that the heterogeneous weather data relevant to the system 100 are stored in a centralized database 103 that manages the updates, distribution, and archiving of such data. As another example, as shown in FIG. 1F and FIG. 1E, a region or nation may have a number of distributed data centers having sub-servers 111 and sub-databases 113, or a hybrid of a centralized database 103 and a number of distributed data centers having, for example, sub-databases 113. Thus, a server 101 and/or a sub-server 111 may be configured to receive inputs from a centralized database 103, distributed data sources 105, 111, 113, or a combination of data repositories and data-generating resources.

In some implementations, the server 101 may independently adapt and maintain its own input data needs based on its proximity to data sources 105 in question, so as to minimize latency and maximize computational efficiency for generating nowcast weather projection products that may be provided to user devices 107 and assist with time-critical operational decision-making. In such implementations, "proximity" may refer to physical proximity, or it may also refer to the speed (e.g., transfer latency) at which the relevant weather data is ready for use by the nowcasting server 101.

Turning back to FIG. 1A, in some embodiments, a system 100 may generate and serve nowcast weather projection products through a web-based service, where data outputs generated by a nowcasting server 101 and/or data stored in a database 103 may be accessed remotely by user devices 107 through natively installed software and/or through a browser of a user device 107. When the user device 107 accesses data outputs or otherwise stored by the system 100 via a web browser program, the system 100 may comprise a webserver (not shown) executing webserver software that is configured to host a website having interactive webpages, which may be browser-based interactive GUIs configured to display, for example, data generated by a nowcasting server 101, such as visualizations of nowcast weather projections for an ongoing convective object or future convective object predictions. In this example, the weather projection products generated by the nowcasting server 101 may be shared among system 100 users, thereby providing a common source of weather situational awareness among operational decision-makers. In such an embodiment, one or more permissions servers (e.g., LDAP server; ACTIVE DIRECTORY® server) may configure which users have access to which portions of shared information in databases 103 of the system 100, where administrators of the system 100 may configure user access privileges as necessary to comply with users' particular management protocol and applicable IT security policy.

As mentioned, a user device 107 may comprise a user display that may display an interactive GUI displaying integrated weather projection outputs and/or related weather data from a nowcasting server 101. In some implmentations, a graphical display may comprise a Quick View interface, which may include a combination of pre-saved images of weather projection fields that may be layered as nowcasting visualization features over a map of the geographic area of interest, where a weather projection field may be a field of view containing features of weather data in a geographic area. In some cases, the graphical display GUIs may dynamically generate images for less frequently viewed weather projection fields, thereby saving device memory space and minimizing processing time on the nowcasting server 101 and/or database 103 by avoiding storing output images or various data plots for many weather projection fields at each weather projection time step. The software of a user device 107 executed to generate a Quick View interface may have access to both primary products and secondary parameters that may be automatically generated by the applied weather projection post-processing techniques, or may be generated on-demand by a system user through a web-based graphic user interface. Primary weather outputs may comprise those weather projection fields that are directly relevant to a user's decision-making needs, including but not limited to: composite reflectivity and echo top data from radar, which may indicate the range and intensity of a storm object; wind speed, which may indicate the presence of a jet stream or wind gusts that may affect flight safety; and freezing level and turbulence index, which may affect flight safety. Secondary parameters may comprise weather projection fields that may require weather expertise to interpret, including but not limited to, 500 hPa geopotential height, mixing ratio, relative humidity, dew point, and convective available potential energy. A Quick View interface may allow system users to perform overlays for multiple weather elements at different vertical levels but may limit a system user's options to perform advanced analyses, queries, or other geospatial operations that may be relatively time-consuming or require a large amount of system processing power, such as, but not limited to and not necessarily including, zooming in or out or overlaying a forecast model cloud ceiling field on runway locations.

In some embodiments, a user device 107 may execute software for a decision support tools module. The various weather projection outputs of one or more weather projection modules and weather projection sub-modules may be converted to geospatial map layers, which may be integrated into an integrated weather projection product thereafter. The decision support tools module may be configured to receive the geospatial map layers or the integrated weather projection product, as well as operational constraints relating to a designated event or set of events. In turn, the decision support tools module may generate outputs designed to assist system users in operational strategic and tactical decision-making with respect to the designated event or set of events, including but not limited to graphic displays or web-based map services. The decision support tools module may generate such outputs by performing geospatial calculations, including but not limited to intersecting, sub-setting, and joining, which synthesize weather projection products and received operational constraints. For example, such a decision support tools module may be used for ATM/C, wherein the weather projection products generated by the exemplary weather projection modules and weather projection sub-modules comprising an embodiment of the system as applied to ATM/C may be converted to geospatial map layers and input into a decision support tools module, either as individual geospatial map layers or as an integrated weather projection product comprising an integrated set of geospatial map layers. In this example, airspace constraints and other relevant ATM/C operational constraints may also be input into a decision support tools module. Such ATM/C operational constraints may comprise static and dynamic constraints, including but not limited to scheduled or real-time and flight status, historical or real time air traffic patterns, fly/no-fly thresholds, and strategic and tactical decision scenarios. Such decision support tools module may be configured to generate products to assist ATM/C personnel with strategic and tactical decision-making in relation to scheduled flights, including but not limited to graphic displays or web-based map services.

FIG. 1E shows components of a nowcasting system 100, according to an exemplary embodiment. In some embodiments, a nowcasting system 100 may allow subscribing entities, such as air traffic control systems of various airports, to subscribe to portions of data stored in a database 103 of the system 100. The exemplary system 100 comprises a nowcasting server 101, a database 103, sub-servers 111, and sub-databases 113. The sub-servers 111 and sub-databases 113 may host, either physically onsite or through a virtualized connection to a cloud-based server 101 and database 103, data processes and data records most relevant to the particular geolocation.

For example, an airport in Shanghai may subscribe to Shanghai-specific data, an airport in Sydney may subscribe to Sydney-specific data, and an airport in Paris may subscribe to Paris-specific data. Administrators of the system 100 may, in this example, provision or otherwise generate a Shanghai sub-server 113*a* and sub-database 113*a*, where the sub-server 113*a* may execute nowcasting algorithms and processes tailored to a predetermined geolocation-limited area relative to Shanghai, such as a perimeter distance from the Shanghai airport, a geographically-defined region (e.g., continent of Shanghai, country and nearby countries relative to Shanghai), and/or a geographic area of responsibility of the Shanghai airport and nearby airports. Data records of imagery data and airports may comprise geographic indicator data fields that indicate to a server 101 which database 103 data should be provided (e.g., replicated) to sub-databases 113 corresponding to the particular geographic indicator of the data. A Shanghai sub-database 113*a* may contain, or otherwise reference, data records having geolocation data fields within the predetermined area relative to Shanghai. As such, rather than reference all global records in a database 103, the Shanghai sub-server 111*a* may quickly access only those data records in the Shanghai sub-database 113*a*, where the data records contain data related to the relevant geographic area according to the geographic data field that indicates the data records are within the geolocation area of Shanghai.

In operation, a nowcasting server 101 may be configured to generate nowcasting forecasts based on a predetermined set of data records according to a set of algorithms and models. In some implementations, a sub-server 113, such as the Shanghai sub-server 113*a*, may also execute processes, algorithms, and data models that are tailored to the idiosyncratic weather behaviors of the predetermined geolocation area, such as an area within a perimeter distance relative to Shanghai. In such implementations, the algorithms and data models for generating nowcasting data may be provisioned by a server 101 to a particular sub-server 111, where the particular sub-server 111 may update or otherwise adjust the algorithms and/or data models relative to data in a corresponding sub-database 113. In some circumstances, as each sub-server 111 retrains or otherwise adjusts the respective data models and/or algorithms over time, the algorithms and/or data models of each sub-server 113 may drift further apart in the manner each sub-server 111 generates nowcasting data. A person having ordinary skill in the art would appreciate that such algorithms may include, for example, machine-learning algorithms that allow each server 101 and/or sub-server 111 to adjust the models and algorithms used by the nowcasting to, for instance, generate the nowcasting data based on records from a corresponding database 103 or sub-database 113.

FIG. 1F is a block diagram of the weather data flow of an exemplary system 100 as applied to ATM/C. FIG. 1F shows examples of various weather data sources 105, the data of which may be stored in a centralized database 103 and/or in distributed public and/or private data centers having sub-databases 113, at national, regional, and airport levels. These distributed data centers may have sub-servers 111 configured to operate in various operationally relevant locations and may have sub-databases 113 configured to receive all or a relevant subset of the weather data to perform weather forecasting or weather nowcasting. The weather projection outputs of the distributed data centers, which may be updated at varying time intervals, may be transferred to a system-wide information management system, such as a centralized database 103 and/or nowcasting server 101, to which some or all data centers and user devices 107 of the system 100 may have access.

In some embodiments, a nowcasting server 101 may comprise executable software programs and/or application programmable interfaces (APIs), which may include weather projection modules, each of which may comprise weather projection sub-modules, all of which are tailored to provide weather projection outputs for certain specified system operating parameters, such as spatial range and temporal range in relation to a designated event (e.g., convection object, airplane takeoff/landing). An administrator may use, for example, a user device 107 to input and configure the weather projection modules and weather projection sub-modules of the nowcasting server 101, to receive weather data inputs compatible with or otherwise intended to be used by each weather projection module or weather projection sub-module's specified operating parameters.

In some implementations, like the example shown in FIG. 1B, the nowcasting server 101 may execute software modules that the user may configure to apply quality control techniques appropriate to each data type, in accordance with operational constraints defined a priori and adjust as necessary based on the needs of a user. The quality control processes applied to the weather data inputs may include, but are not limited to, removing noise from observation data, for example, ground clutter from weather radar observations; rejecting certain observations because they exceed the permissible statistical thresholds predetermined according to configurations of the server 101; applying grid statistical interpolation to observation data to smooth out extreme values within the data and control the level of background observation error; and mapping the results onto weather projection models or other grids that may be required by other processing algorithms. In some cases, weather projection modules and weather projection sub-modules may apply various weather data processing techniques, such as weather forecasting, as shown FIG. 1C, and weather nowcasting, as shown in FIG. 1D, as appropriate for the specified operating parameters in relation to a designated event or set of events, so as to yield the most efficient and effective weather projection outputs.

For example, a system 100 according to the present disclosure may be used for ATM/C, wherein a weather projection module of a server 101 or sub-server 111 may comprise a regional weather projection module configured to generate national and regional weather projections. In this example, a weather projection sub-module of such regional weather projection module may be a national forecasting sub-module, like in FIG. 1C, configured to generate weather forecasts covering national airspace up to, for example, 48 hours prior to the operational event or set of events. Such a national forecasting sub-module may provide medium spatial resolution, for example, approximately 9 km, and weather forecasts updated approximately every 3 to 6 hours, through which users, such as ATM/C personnel, may make strategic operational decisions in relation to scheduled flights in response to large-scale weather phenomena.

In this example, another weather projection sub-module of such regional weather projection module may comprise a regional forecasting sub-module configured to generate weather forecasts covering both regional and national airspace up to 24 hours prior to the operational event or set of events. Such a regional forecasting sub-module may provide high spatial resolution, for example, approximately 3 km or less, and weather forecasts updated approximately every hour, through which users, such as ATM/C personnel, may make strategic operational decisions in relation to scheduled flights in response to short duration but high impact weather.

As another example, a server 101 or sub-server 111 may execute a weather projection sub-module of a regional weather projection module may comprise a regional nowcasting sub-module, like in FIG. 1D, configured to generate weather nowcasts covering regional airspace up to 2 hours prior to an operational event or set of events. Such a regional nowcasting sub-module may provide high spatial resolution, for example, approximately 3 km or less, and regional weather nowcasts updated, for example, approximately every 6 to 15 minutes, through which users, such as ATM/C personnel, may make tactical operational decisions in relation to scheduled flights, such as safely separating aircrafts and circumventing weather-impacted airspace, based on various outputs produced by the server 101 and transmitted to user devices 107 for review. Such a regional nowcasting sub-module may use aviation weather products based on satellite observations, including visible, infrared, and water vapor channels, to derive rain rate, thereby benefitting from a satellite's ability to detect cloud top brightness temperature, which is an indicator of the intensity of within-cloud convection development. Such a regional nowcasting sub-module may also implement radar-derived reflectivity signals, which may be converted into rain rate, thereby benefitting from radar's ability to detect within-cloud convective structure, as well as the radar's derived echo top and maximum reflectivity, which may indicate storm intensity. Additionally, such a regional nowcasting sub-module may integrate satellite observation-derived aviation weather projection products and weather radar mosaics, if available, to achieve weather nowcasting of storm motion with the combined advantages of using each of the types of data sources. The combination of satellite and radar data products to derive rain rate provide an integrated depiction of storm motion locally observed by radar within the large scale context of hemispheric observations by geostationary satellite.

In this example, a system according to the present disclosure may be used for ATM/C, wherein a server 101 or sub-server 111 may execute a weather projection module that comprises a local weather projection module configured to generate local weather nowcasts. In this example, a weather projection sub-module of such local weather projection module may be a local nowcasting sub-module configured to generate a weather nowcast covering, for example, terminal radar approaching control for up to 90 minutes prior to an operational event or set of events. Such a local nowcasting sub-module may provide high spatial resolution, for example, approximately 2 km or less, and severe weather nowcasts updated, for example, approximately every 5 to 10 minutes, through which users, such as ATM/C personnel, could make tactical operational decisions in relation to an aircraft's ascent and landing approach, based on the outputs from the server 101 and transmitted to user devices 107. In some implementations, a a local nowcasting sub-module may apply nowcasting algorithms and rely on as a data source 105 airport weather Doppler radar data for regional areas within a 150 km radius of the relevant location.

As another example, a server 101 or sub-server 111 may execute a weather projection sub-module of a local weather projection module, where the module or sub-module may comprise a local severe weather alert sub-module configured to generate weather nowcasts covering, for example, airport runway and terminal areas for up to 60 minutes prior to an operational event or set of events. Such a local severe weather alert sub-module may provide high spatial resolution (e.g., approximately 1 km or less), and runway and terminal severe weather alerts may be updated, for example, approximately every 1 to 5 minutes to support the air traffic control tower for takeoff and landing. Such a local severe weather alert sub-module may focus on weather related hazards that affect flight takeoff and landing safety, including: low cloud ceiling; low visibility at or near runways due to fog or heavy precipitation (e.g., snow, rainfall); wind gusts (e.g., strong cross-winds on runways); low level wind shear, such as wind measurements relatively close to or otherwise related to identified strong convection or microbursts near runways; heavy snow accumulation on runways; and runway icing. In some implementations, a local severe weather alert sub-module of a server 101 or sub-server 111 may integrate or otherwise receive data from multiple data sources 105 that are dense and specialized sensor networks around runways and in the vicinity of airports. A server 101 may apply nowcasting algorithms, and generate rapid, real-time, or near real-time, updated alerts for the area on and around airport runways.

For the avoidance of doubt, one having ordinary skill in the art will understand that the time and distance intervals set out in the foregoing examples are merely exemplary, and may be adjusted as appropriate for the intended application.

In some embodiments, a server 100 or sub-server 111 may be configured to execute weather projection modules and weather projection sub-modules for different geographic regions, configured to generate weather projection outputs for their respective received system operating parameters (e.g., geography), and apply weather nowcasting, and techniques that generate weather data outputs that are compatible with other software modules of the system 100, such as weather forecasting modules. The weather projection outputs generated by each weather projection module or weather projection sub-module for the received system operating parameters may be integrated into one integrated weather projection output comprising all, or a subset of, the weather projection outputs generated by the set of modules and sub-modules of the integrated weather projection nowcasting system 100. Multiple devices of the system 100, such as nowcasting servers 101 and sub-servers 111, may execute parallel computing functions, where an administrative computing device (not shown) may executed software programs that facilitate resource-sharing among various weather projection modules and weather projection sub-modules, including but not limited to the sharing of software code libraries; parallel computing methodology; ancillary data (e.g., land surface classification) from a third-party data source 105; common data quality control procedures for data quality control APIs; and calculated and converted geospatial map layers, thereby enhancing the consistency and efficiency of such weather projection modules' and weather projection sub-modules' performance and products.

Weather projection outputs generated by weather projection modules and weather projection sub-modules of a server 101 or sub-server 111 may be vary according to settings and configurations of the software modules. For instance, the software modules may be configured to generate weather projection outputs having higher resolution and smaller scale based on received system operating parameters (e.g., instruction settings) from a user device 107. Likewise, operating parameters from the user device 107 may configure the weather projection modules or weather projection sub-modules to generate weather projections of coarser resolution and larger scale. In some implementations, the server 101 may embed weather projection outputs having higher resolution and a smaller scale within weather projection outputs having coarser resolution and larger scale. Such an embedding structure of a file or data stream of the weather projection output may enable user device 107 users to view local weather projection outputs in context of a larger scale weather situation.

In some implementations, various modules and sub-modules mentioned herein may be configured to exchange data with one another, such that servers 101 and sub-servers 111 may interact, collaborate, or otherwise share data. For example, the exemplary regional weather projection module and local weather projection module, including the various exemplary sub-modules therein—e.g., a national forecasting sub-module; the regional forecasting sub-module; the regional nowcasting sub-module; the local nowcasting sub-module; and a local severe weather alert nowcasting sub-module—may interface with each other so as to create an integrated weather projection nowcasting system 100 comprising a collection of devices that collectively produce an integrated weather projection output that is continuous within the temporal domain and spatial domain covered by the exemplary weather projection modules and weather projection sub-modules, subject to data availability. As an example, the national forecasting sub-module, the regional forecasting sub-module, the regional nowcasting sub-module may be embedded within the regional weather projection module. Similarly, the local nowcasting sub-module and the local severe weather alert nowcasting sub-module may be embedded within the local weather projection module. Additionally, the local weather projection module may be embedded in the local nowcasting sub-module, which may be embedded in the regional nowcasting sub-module, which may be embedded in the regional forecasting sub-module, which may be embedded in the national forecasting sub-module.

In some embodiments, the exemplary weather projection modules, including some or all of the weather projection sub-modules therein, may be installed in various data center locations that are relevant to a designated event or set of events. Software installation at various servers 101 and sub-servers 111 may include weather projection modules and weather projection sub-modules appropriate for a user's predetermined spatial range and temporal range in relation to the designated event or set of events. A user device 107 may configure installed weather projection module or weather projection sub-modules such that a particular software module has adequate access to predetermined weather data records that the software module or sub-module may typically process. In some embodiments, computational workload for one or more sub-servers 111 (e.g., weather projection modules, weather projection sub-modules) may be distributed among one or more sub-servers 111 (e.g., weather projection modules, weather projection sub-modules). In some cases, workload load-balancing may depend on a sub-server 111 access to various weather data inputs from various sources 105 and/or data records of the database 103 or sub-database 113. For example, rather than executing comparatively heavy computational workload at a local sub-server 111a, the resulting weather projection outputs— which may have much smaller data volume than the inputs—may be assembled at a comparatively more powerful server 101 designed to have enough storage and bandwidth to serve system users through an internet connection.

One having skill in the art would appreciate that servers 101 and sub-servers 111 of the system 100, once each local weather projection module or weather projection sub-module is installed and configured, the servers 101 and sub-servers 111 may be connected to an IT infrastructure of the system 100 to access one or more networks 109. Users at various the locations (e.g., airports, data center) may gain system-wide data access to view outputs of other weather projection modules and weather projection sub-modules installed and configured at other locations, or a subset thereof, connected to the system network 109. As a result, such an embodiment of the system 100 may provide a common operating picture for users and enhance each user's real-time weather situational awareness. When generating integrated weather projection nowcasting outputs, nowcasting servers 101 and sub-servers 111 may generate weather information containing spatial and temporal continuity, subject to data availability, under a common software architecture that optimizes software code efficiency and maintains consistency and cohesiveness among every service function and any variations therein. Participation in and access to such an integrated weather projection outputs may be available to all users of an embodiment of the present disclosure, or only to users within a specific subset of users, or any combination thereof, depending on configuration inputs from a user device 107 of an administrative user.

Exemplary Methods of Execution

As described herein, computer-implemented software components may provide for predicting evolution of a convective weather object to include its future development. A device of the system, such as a nowcasting server, may query database records of current and/or historical weather data of a target convective weather object. The system may perform evolution process recording of the convective object instances, and execute various machine-learning, modeling, and predictive algorithms to determine data related to and indicating ongoing and future convective object evolution.

Generally, to achieve a reliable prediction of convective evolution within, for example, the next 1-3 hours, the nowcasting system may first collect and blend convective weather observation data from multiple data source platforms (e.g., ground radar, satellite, flash sensor, in situ observation, model prediction) to generate comprehensive information (e.g., radar reflectivity, object size, cloud top temperature, trend, flash statistics, etc.) about one or more weather convective objects. The nowcasting system may track the convective objects within their lifespan, from initialization to dissipation, by recording the various convective data parameters during the lifespan of a convective object into one or more data records of a convective evolution database. The nowcasting system may reference the database records containing present and/or historical information of an ongoing target convective object by executing one or more machine learning algorithm to "learn" from the data in a convective evolution database. The nowcasting system may then execute predictive algorithm to predict the most likely future evolution characteristics (e.g., speed, intensity, movement) for an ongoing target convection object.

Figure 2:
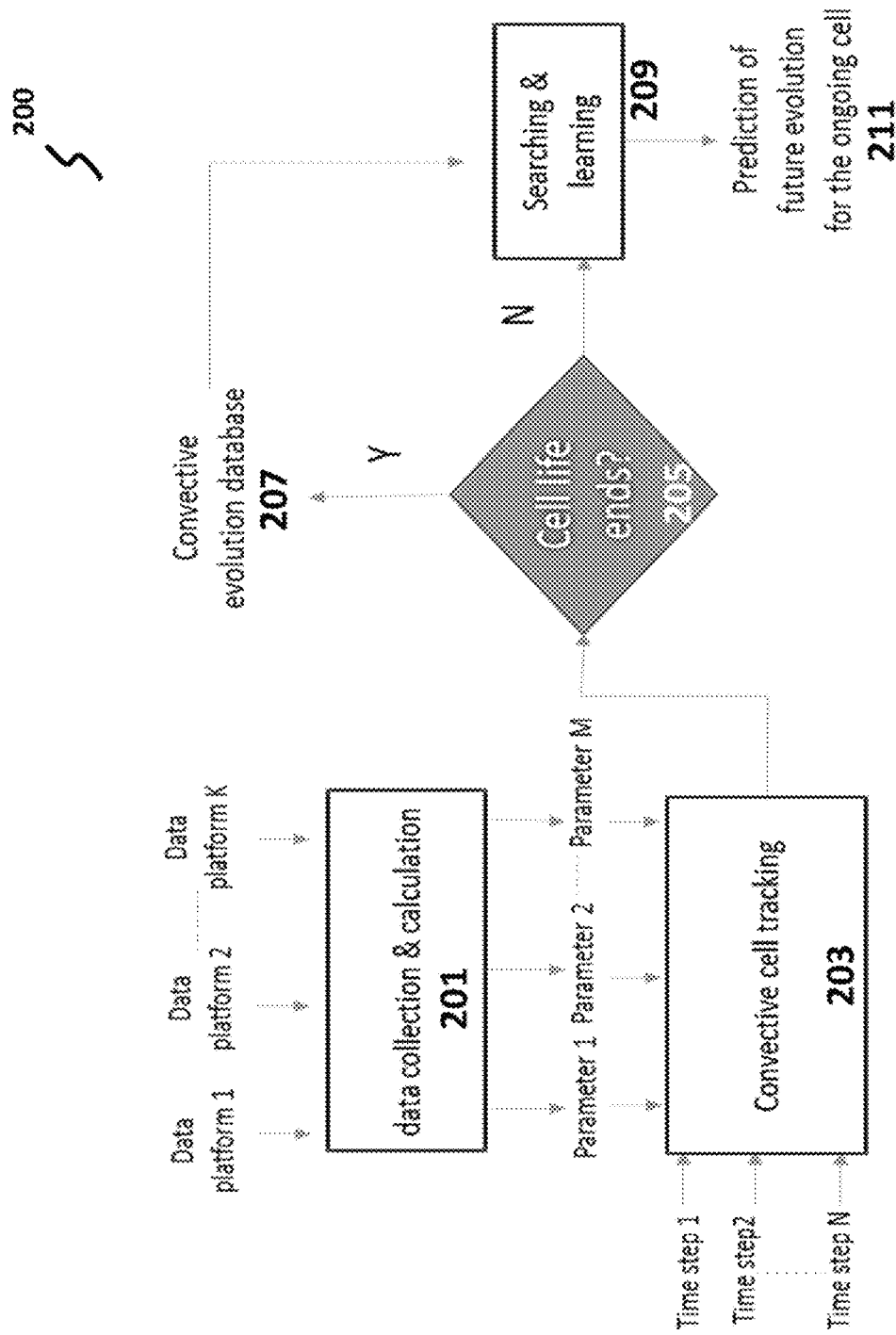
FIG. 2 shows execution of a method of generating and updating nowcasting weather data, according to an exemplary embodiment.

FIG. 2 shows execution of a method 200 of generating and updating nowcasting weather data, according to an exemplary embodiment. It should be appreciated that each of the execution steps described herein may be executed by one or more computing devices, such as a server or sub-server of a nowcasting system. The exemplary method 200 may comprise steps 201, 203, 205, 207, 209, and 211. However, one having skill in the art would appreciate that some embodiments may comprise additional or alternative steps, or may omit one or more steps altogether and still fall within the scope of this description.

In a first step 201, a nowcasting server may perform data collection and parameter calculation. The observation data from different data sources may be received by the nowcasting server, where the observation data reflects various different physics data of Earth's convective process (i.e., weather data). Data platforms may function as data sources for the nowcasting system, and may generate, convert, and transmit the weather data into a digitized format compatible with the nowcasting system. The weather data may be then be stored into data records of a database of the nowcasting system. For example, satellite brightness temperature (BT) measurements at infrared bands depend on cloud-top height and a rapid decrease of satellite BT measurements and may indicate to the server initialization of convective process (i.e., a storm system). Radar reflectivity measurements mainly depend on the size of rain drops and represent convective intensity in 3D space. The presence of "flash" in lightning images generally means the happening of strong thunderstorm. In-situ rainfall measurements may indicate to the server the amount of rain that reaches ground. This weather observation data may be digitized or otherwise converted to a compatible format by the data platform server or by a server of the nowcasting.

Weather observation data received by a server of the nowcasting system from each available convective observation data source may provide the comprehensive information of past convective instances (e.g., previous weather events), allowing the server to generate data indicating the evolution prediction of ongoing convective instances. Different observation data sources usually generate data indicating different weather data coverages, resolutions, and convective instance strengthens or weaknesses, so using comprehensive observation data from multiple data source may increase the spatial coverage and reliability of convective observation data generated by the server. As mentioned, in some implementations, a server of the nowcasting system may receive three-dimensional reflectivity data from radar data sources, BT data from geostationary satellite image data sources, and flash statistical data from station network data sources. One having skill in the art would appreciate that additional or alternatively types of observation data may be included from additional or alternative data sources.

The server may calculate the important parameters for convective objects using the collected weather observation data, which may include object maximum reflectivity, maximum reflectivity change rate, object area, object area change rate, object coldest BT, coldest BT change rate, and flash statistics.

Figure 3B:
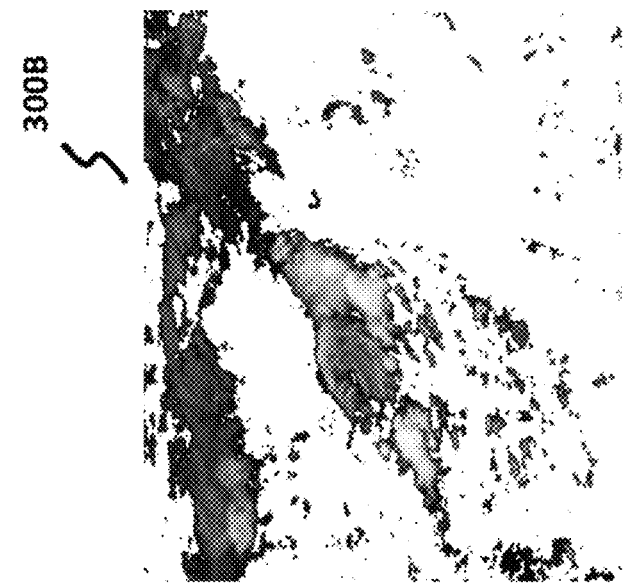
FIGS. 3A and FIG. 3B shows GUIs displaying the simultaneous convective observations from radar composite reflectivity and satellite brightness temperature.
Figure 3A:
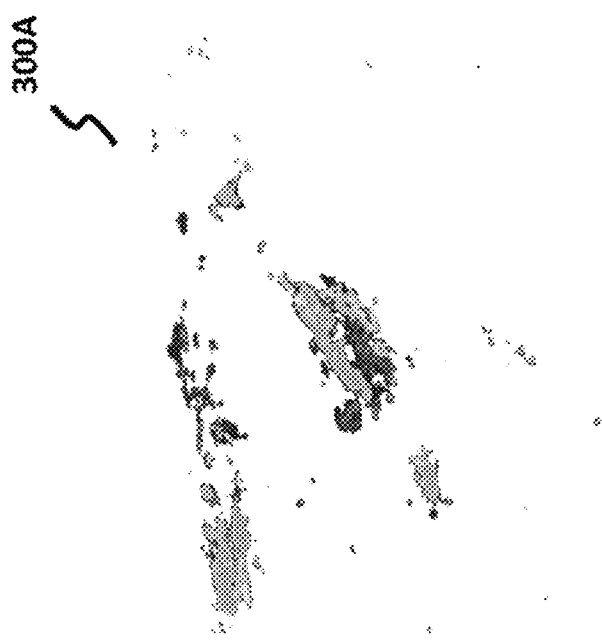

Turning to FIG. 3A and FIG. 3B show GUIs displaying simultaneous convective observations from radar composite reflectivity and satellite brightness temperature respectively, where such data is received from various data platforms (e.g., radar imagery data source, satellite data source). More specifically, FIG. 3A shows a radar GUI 300a displaying real-time observed weather data, according to an exemplary embodiment, where the radar GUI 300a shows the process of convective object tracking and recording based on radar reflectivity data received from a related data source. FIG. 3B shows a satellite GUI 300b displaying real-time observed weather data, according to an exemplary embodiment, where the satellite GUI 300b shows the process of convective object tracking and recording based on satellite brightness temperature data received from a related data source.

Turning back to FIG. 2, in a next step 203, the nowcasting server perform object tracking and data recording. The nowcasting server may use the parameters of the currently provided observation weather data to track a convective weather object. In operation, the nowcasting server may identify convective objects in satellite BT and radar reflectivity images, based upon predetermined parameters and thresholds that indicate to the server, and the server may extrapolate, the initialization or dissipation of a convective object. The nowcasting server may continue to receive and/or generate ongoing weather observation data for a convective object from a time when the server detects initialization of the convective object to a time when the server detects dissipation of the convective object, thereby allowing the server to "track" a storm system from initialization to dissipation. As an example, for cloud BT image, a convective object is defined by the server grouping connected pixels that have BT colder than a BT threshold parameter. As another example, for radar reflectivity image, a convective object is defined by the server by grouping connected pixels that indicate reflectivity larger than a reflectivity threshold. In some implementations, the threshold values are configurable with user's preferences, thereby allowing the user to tailor the sensitivity of what the server determines is, for example, initialization or dissipation of a convective object. Upon identifying initialization of one or more convective object based upon parameter values in the image data, the nowcasting server may assign the convective object in the image a unique number in a database record of the ongoing convective object, and related weather data from the various data sources may be stored into database records associated with the unique identifier value of the convective object.

As mentioned, the nowcasting server may store into a database weather data and/or image data for a convective object identified in one or more images. In some embodiments, a nowcasting server may generate a convective object time series from one or more database records associated with a convective object that has been identified in each of a number of images over time. The time series generated by the server may contain the same convective object at different time steps; where the server may "push" overlapping convective objects into a machine-readable format or file containing a object stack of images. For example, during a convective initialization stage, when, for example, the radar reflectivity may be less than but close to a parameter threshold, convective objects that the server may have identified in a cloud BT image are pushed by the server into a time series stack first. Once convective objects show on a next radar reflectivity image, the images may be pushed into the stack in addition to, or as replacement to, the existing images in the ongoing time series stack of images. If the server cannot identify a convective object time series in the stack in a successive object of a most recent weather observation image (e.g., radar reflectivity image), then the convective object time series ends and the server may discard a file identifying or containing the time series stack of images. The server may then record the weather observation data associated with the convective object's time series of images or other observation data from various additional input sources.

In a next step 205, the nowcasting server may determine whether a target convection object has ended (e.g., the convection object has dissipated) according to image data, and any other weather data input. As an example, when the nowcasting server is tracking an ongoing target convection object (e.g., receiving weather observation data and/or image data for the convection object) that the nowcasting server has identified as initialized, the nowcasting server may at some time step determine that the target convection object has or is dissipating. Similar to detecting initialization of a convection object, the nowcasting server may determine that the image data and/or other weather observation data inputs have values that exceed or satisfy thresholds suggesting or indicating the convection object has dissipated or is about to dissipate.

In a next step 207, the nowcasting server may store the convective parameter values that were identified from the images and any other data source input data while generating the time series. These images and values may be stored into one or more databases, such as a convective evolution database, where the data and images may be stored in one or more database records, and the data may be associated with a unique identifier for the targeted convective object. Data points for evolution processes (e.g., data points from images and/or weather observation data inputs indicating convective object behavior) of one or more convective objects may be stored into database records of, for example, a convective evolution database.

In a next step 211, the nowcasting server may reference evolution process data points in database records of historic and/or current convective objects to generate a convective evolution prediction when the nowcasting server identifies and tracks future or ongoing target convective objects (e.g., generates real-time or near-term data).

If, when determining whether a target instance of a convective object time series from FIG. 3 has ended in step 205, the server has detected that the convective object has not dissipated, and is thus ongoing, in a next step 209, the server may search and learn one or more databases to generate and predict upcoming evolution of a convective object. The nowcasting server may predict the upcoming, near-term evolution over the next, for example, three hours by using the existing observation data in the convective evolution database. The nowcasting server may first use the parameters of the ongoing target instance to select a database instance of a closest convective time series in the convective evolution database. Then, the nowcasting server uses the selected database instances to predict the object area and object maximum reflectivity for the ongoing target instance in the next three hours. Finally, the reflectivity changes at different predicted future time steps generated by the server are calculated for every pixel in the target instance using the predicted changes of object area and object maximum reflectivity. The method 200 may continue to a next step 211 to generate a convective evolution prediction.

Figure 4:
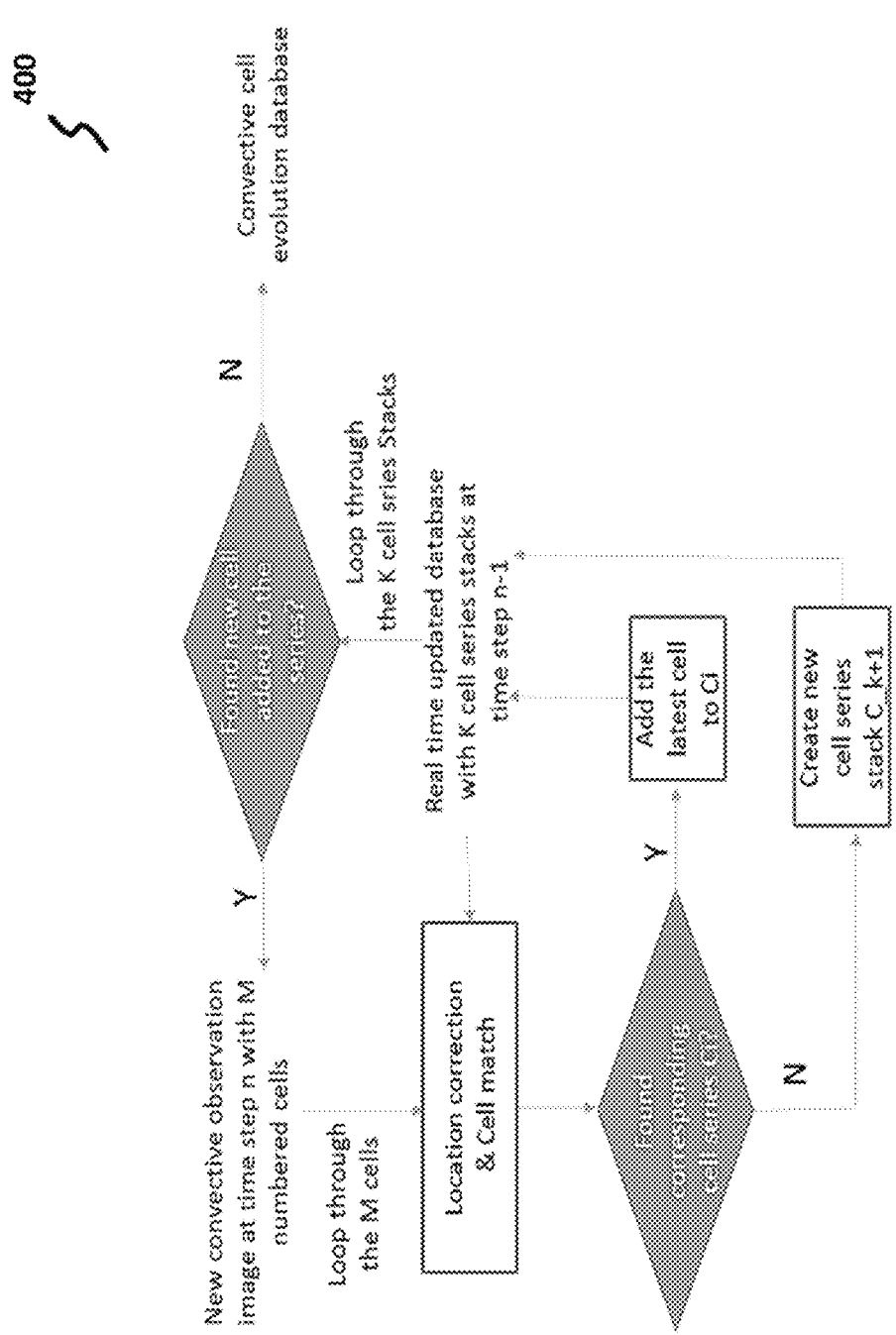
FIG. 4 shows execution of a method of managing and updating records of nowcasting weather data in a database, according to an exemplary embodiment.

FIG. 4 shows execution of a method 400 of managing and updating records of nowcasting weather data in a database, according to an exemplary embodiment. It should be appreciated that each of the execution steps described herein may be executed by a server or sub-server of a nowcasting system. The exemplary method 400 may comprise steps 401, 403, 405, 407, 409, 411, 413, 415, 417, and 413. However, one having skill in the art would appreciate that some embodiments may comprise additional or alternative steps, or may omit one or more steps altogether and still fall within the scope of this description.

The nowcasting server may identify a new convection observation image. In some implementations, each convection observation image in a time series the server is generating for a convection object. Database records for each observation image may be associated with a unique identifier for the convection object. A database record may also contain an identifier for the image according to, for example, a time step (n). The database records for the time series of the convection object may indicate a total number of convection objects (M).

A) Instance Searching

The nowcasting server may directly query data records of the objects based on a unique identifier value associated with a particular object, or the nowcasting server may loop through each of the objects.

The nowcasting server may calculate the distance between a target instance of a database instances of convective objects for the given area, which may be stored in a database or a sub-database and may be based on latitude and longitude data of the target instance and other database instances. Based on this calculation, the server may search the convective evolution database and find the database instances that are close to an ongoing target instance. One having skill in the art would appreciate that any number of geographic or location data points for convective objects may be used to determine distances between historic or ongoing convective objects, and/or determine distances between locations of a particular target convection object for successive time steps in the time series of data for the target convection object instance.

In a determination step, the server searches for determines whether it has identified corresponding convective object time series. A target convective instance $C_t$ consists of object time series $\{c_{ti}|_{i=1}^{n}\}$ and a database instance $C_d$ is consists of object time series $\{c_{di}|_{i=1}^{m}\}$, where m and n are time step numbers: n is the step number at present for an ongoing convective object instance, and m is the last step number during a lifespan for a database instance of a convective object. If the length (e.g., number of time steps) of a database instance $C_d$ (m) is less than the length of the ongoing target instance $C_t$ (n), then the server determines that the instances are not corresponding to a time series, as the prior instance $C_d$ is not a useful instance for the prediction of the future of the ongoing target instance $C_t$ and the distance is considered as infinitely large. Otherwise, the nowcasting server calculates the Mahalanobis distance between the instances, according to, for example, equation (1).

$$d(\vec{X_t}, \vec{X_d}) = \sqrt{(\vec{X_t}-\vec{X_d})^T S^{-1} (\vec{X_t}-\vec{X_d})} \quad \text{Equation 1:}$$

Where $\vec{X_t}$ is the observation vector for $C_t$ and $\vec{X_d}$ is the observation vector for the prior database instance $C_d$. One having skill in the art would appreciate that there are several ways and parameter inputs that the server may use to define an observation vector for the convective instances. In the exemplary method 400, an observation vector may include, for example, maximum reflectivity at time step n, object area at time step n, object coldest BT at time step n, object area change rate at time step n, and object coldest BT change rate at time step n.

There are different ways to select the closest database instances for the prediction of target instance's future. In the exemplary method 400, the distances between the target instance $C_t$ and every database instance are calculated and find the closest distance $d_{min}$. Then all database instances that are within $2*d_{min}$ are selected to predict the object maximum reflectivity and object area of target instance for the next 3 hours.

When a corresponding series is identified by the nowcasting server, the nowcasting server may include the current object time series for a database record of an target object. When a corresponding series is not identified by the nowcasting server, the nowcasting server may generate a new database record for a new time series that is associated with the target object.

B) Prediction of Object Maximum Reflectivity and Object Area

To predict the future object maximum reflectivity and object area for the ongoing target instance, inverse distance weighted average is applied to the M-selected database instance and calculate the change of object maximum reflectivity and object area. Equation (2) and equation (3) show how the server calculates the predicted changes of object maximum reflectivity and object area some number (i) of time steps later for the ongoing target instance.

$$r\_t_{n+i} = \frac{\sum_{j=1}^{M} r\_d_{j,n+i} * \frac{1}{d_j}}{\sum_{j=1}^{M} \frac{1}{d_j}} \quad \text{Equation 2}$$

Where $r\_t_{n+i}$ is the predicted ratio between the convection object area at time step n+i (i step later) and the object area at current time step n (present time step) for the target instance; $d_j$ is the distance of the jth database instance to the target instance; $r\_d_{j,n+i}$ is the ratio between the object area at time step n+i (i step later) and the object area at current time step n (present time step) for the jth database instance.

$$\Delta Zmax\_t_{n+i} = \frac{\sum_{j=1}^{M} \Delta Zmax\_d_{j,n+i} * \frac{1}{d_j}}{\sum_{j=1}^{M} \frac{1}{d_j}} \quad \text{Equation 3}$$

Where $\Delta Zmax\_t_{n+i}$ is the predicted difference between the object maximum reflectivity at time step n+i (i step later) and the object maximum reflectivity at time step n (present) for the target instance; $d_j$ is the distance of the jth database instance to the target instance; $\Delta Zmax\_d_{j,n+i}$ is the difference between the object maximum reflectivity at time step n+i (i steps later) and the object maximum reflectivity at time step n (present) for the jth database instance.

C) Calculation of Reflectivity Change for Every Pixel

A linear model, as shown in equation (4), is used by the server to estimate the reflectivity change i steps later for every pixel in the target instance and its surrounding area.

$$\Delta Z\_t_{n+i} = \Delta Zmax\_t_{n+i} - (\Delta Zmax_{n+i} - \Delta Zmin_{n+i}) \frac{Zmax\_t_n - Z\_t_n}{Zmax\_t_n - Zmin\_t_n} \qquad \text{Equation 4}$$

Where $\Delta Z\_t_{n+i}$ is the predicted reflectivity change i steps later of a pixel with reflectivity value $Z\_t_n$ at present; $\Delta Zmax\_t_{n+i}$ is the estimated change of object maximum reflectivity $Zmax\_t_n$ at i steps later from equation (3); $\Delta Zmin_{t_{n+i}}$ is the estimated reflectivity change i steps later for pixels with a low-bound reflectivity $Zmin\_t_n$. The low-bound reflectivity is a reflectivity value which needs to be changed to the threshold value (Zthreshold) of the convective object based on the predicted change of object area from equation (2). In other words, $r\_t_{n+i}$ from equation (2) is converted to reflectivity value $Zmin\_t_n$ where $\Delta Zmin_{t_{n+i}} = Zmin\_t_n - Zthreshold$. To get $Zmin\_t_n$ from $r\_t_{n+i}$, the server may, though not necessarily, first calculate the cumulative distribution function (CDF) of the reflectivity values for present object of the target instance and its surrounded area, $$F_z(x) = P(Z > x) \qquad \text{Equation 5:}$$

The present object area (at time step n) of the target convective instance is $A\_t_n = F_z(Zthreshold) * N_{total} * R$, where $N_{total}$ is a total pixel number of the present object and its surrounding area, and R is the resolution area. Given a predicted object area, determined by the server at $A\_t_n * r\_t_{n+i}$, i steps later, the CDF value at Zthreshold some i steps later, $F_z(Zthreshold)$, should be $$\frac{A\_t_n * r\_t_{n+i}}{N_{total} * R}.$$

Therefore, the low-bound reflectivity value for present target object should be, $$Zmin\_t_n = x \mid \left\{ F_Z(x) = \frac{A_{t_n} * r_{t_{n+i}}}{N_{total} * R} \right\} \qquad \text{Equation 6}$$

With the $Zmin\_t_n$ from equation (6), $\Delta Zmin_{t_{n+i}} = Zmin\_t_n - Zthreshold$, $\Delta Zmax\_t_{n+i}$ from equation (3), and the known $Zmax\_t_n$, the reflectivity changes i steps later can estimated with equation (4) for every pixel in the present object of the target instance and its surrounded area.

Figure 5A:
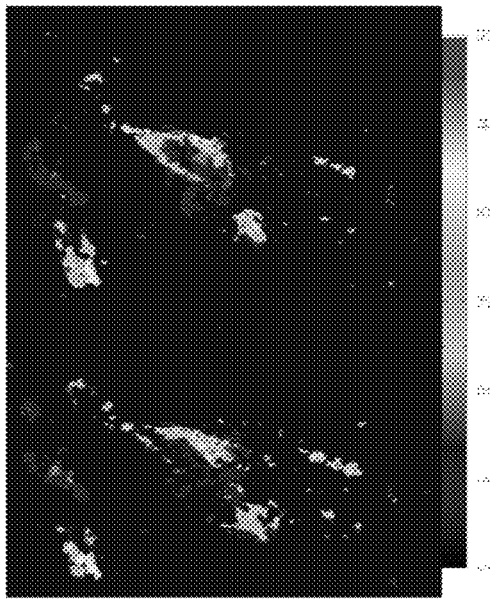
FIGS. 5A-5D show example GUIs displaying nowcasting weather data for a three-hour nowcast data resulting from the nowcasting server, according to an exemplary embodiment.
Figure 5B:
Figure 5C:
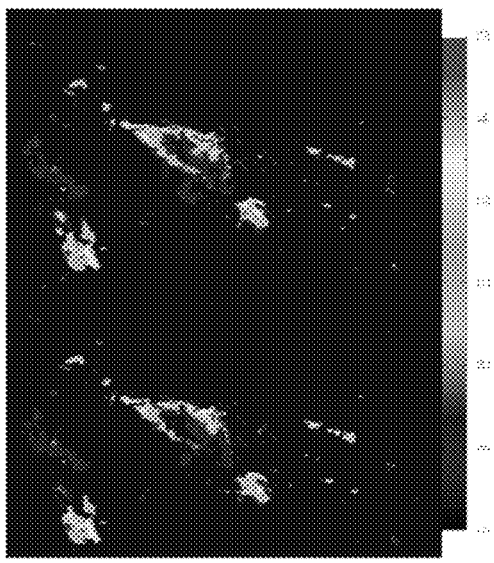
Figure 5D:
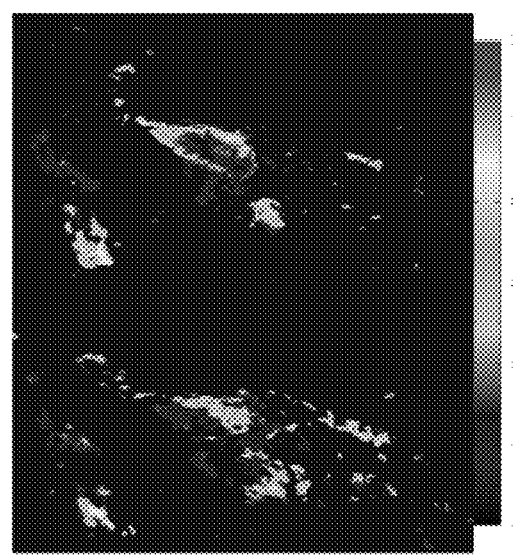

FIGS. 5A-5D show example GUIs displaying nowcasting weather data for a three-hour nowcast data resulting from the nowcasting server, according to an exemplary embodiment. More specifically, FIG. 5A shows a GUI displaying current nowcasting observation data. FIG. 5B shows a one-hour nowcast prediction display, FIG. 5C shows a two-hour nowcast prediction display, and FIG. 5D shows three-hour nowcast predication display. The GUIs show every pixel has its own reflectivity changes in the next zero-to-three hours. The nowcasting server may compare the observation image data and stored data from the database to generate prediction data to determine similar trends of reflectivity changes based on historic convective instances in the image stack.

The methods disclosed herein comprise one or more steps or actions for achieving the described method. The method steps and/or actions may be interchanged with each other without departing from the scope of the present disclosure. In other words, unless a specific order of steps or actions is required for proper operation of the embodiment, the order and/or use of specific steps and/or actions may be modified without departing from the scope of the present disclosure.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or developed in the future. Examples of computer useable mediums include, but are not limited to, primary storage devices (e.g., any type of random access memory), secondary storage devices (e.g., hard drives, SSDs, floppy disks, tapes, magnetic storage devices, optical storage devices, microelectromechanical systems, nanotechnological storage device, Flash, etc.) and communication mediums (e.g., wired and wireless communications networks, local area networks, wide area networks, intranets, etc.).

It is to be understood that the various embodiments disclosed herein are not mutually exclusive and that a particular implementation may include features or capabilities of multiple embodiments discussed herein.

While the present disclosure refers to packets and/or fields within packets by certain specific names, it is to be understood that these names are not intended to limit the scope of the invention in any way and that any name or designator may be given to packets and/or fields described herein as long as it performs the function and/or serves the purpose described herein. It is also to be understood that the invention is not limited to any particular structure and/or organization of packets and/or fields therein.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes and variations which will be apparent to those skilled in the art may be made in the arrangement, operation and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits and algorithm steps described in connection with the embodiments disclosed herein may be implemented as electronic hardware, computer software or combinations of both. To illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. The described functionality may be implemented in varying ways for each particular application—such as by using any combination of MCUs, MPUs, FPGAs, ASICs and/or System on a Chip (SoC), but such implementation decisions should not be interpreted as causing a departure from the scope of the present invention.

The steps of a method or algorithm described in connection with the embodiments disclosed herein may be embodied directly in hardware, in a software module executed by a processor or in a combination of the two. A software module may reside in RAM, flash memory, read-only memory, EPROM memory, EEPROM memory, registers, hard disk, a removable disk, a CD-ROM or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A computer-implemented method for automated modeling, recording, and predicting convective weather, the method comprising:
   receiving, by a computer from one or more image data sources, one or more weather data digital pixel images for a set of time step intervals, the one or more weather data digital pixel images including at least a first weather data digital pixel image for a first time step interval;
   identifying, by the computer, an ongoing convective object in the first weather data digital pixel image based on the presence of one or more predetermined parameters that indicate the presence of a convective object;
   generating, by the computer, a convective object data record for the ongoing convective object, the convective object data record including one or more parameters associated with the ongoing convective object at the first time step interval and at one or more time step intervals after the first time step interval;
   storing, by the computer, the convective object data record in a convective evolution database;
   generating, by the computer, a nowcast output for the ongoing convective object based on (i) the convective object data record for the ongoing convective object and (ii) one or more convective object data records for one or more past convective objects, wherein the nowcast output is generated at least in part using a machine-learning nowcasting algorithm configured to generate a predictive nowcast of an ongoing convective object based on convective object data records for the ongoing convective object and one or more past convective objects; and
   transmitting, by the computer, the nowcast output to one or more user devices configured to display the nowcast output, wherein when displayed on the one or more user devices via a graphical user interface, the nowcast output includes a geographic map indicating a nowcast weather image of the ongoing convective object at a set of future time step intervals.

2. The method of claim 1, wherein the one or more convective object data records for one or more past convective objects comprise one or more convective object data records stored in the convective evolution database.

3. The method of claim 2, further comprising selecting the one or more convective object data records for one or more past convective objects from the convective evolution database based on at least a geographic parameter or a temporal parameter of the ongoing convective object, wherein the geographic parameter indicates a geographic location of the ongoing convective object and the temporal parameter indicates a time of the ongoing convective object.

4. The method of claim 1, wherein storing the convective object data record in the convective evolution database further comprises:
   updating, by the computer, the machine-learning nowcasting algorithm based on the convective object data record and at least one convective object data record in the convective evolution database.

5. The method of claim 1, further comprising receiving, by the computer, weather observation data from one or more data sources, wherein the ongoing convective object is identified based further on the weather observation data.

6. The method of claim 1, further comprising:
   receiving, by the computer, weather observation data related to the ongoing convective object from one or more data sources; and
   storing, by the computer, the weather observation data in the convective object data record.

7. The method of claim 1, further comprising receiving, by the computer, weather observation data from one or more data sources, wherein the nowcast output further is generated based further on the weather observation data.

8. The method of claim 1, wherein the nowcast output is at least one of a machine-readable computer file and a machine-readable data stream.

9. The method of claim 1, further comprising:
   receiving, by the computer from one or more data sources, weather observation data and weather image data; and
   storing, by the computer in a database, the weather observation data and the weather image data received from the one or more data sources.

10. The method of claim 9, further comprising converting, by the computer, the weather observation data and the weather image data received from the one or more data sources into a format compatible with the computer.

11. The method of claim 9, further comprising storing, by the computer, a subset of the weather observation data and the weather image data in a sub-database based on a geographic parameter of the subset indicating a geographic location associated with the sub-database and the subset.

12. The method of claim 1, wherein the nowcast output is generated based on one or more parameters in weather observation data and/or weather image data received from one or more data sources, the one or more parameters selected from the group comprising:
   object maximum reflectivity, maximum reflectivity change rate, object area, object area change rate, object coldest brightness temperature, coldest brightness temperature change rate, and flash statistics.

13. The method of claim 12, further comprising automatically calculating, by the computer, parameter values for each convective object record stored in the convective evolution database during the life span of a respective convective object.

14. The method of claim 1, further comprising searching, by the computer, the convective evolution database to find the one or more past convective objects with one or more parameters that match the ongoing convective object, wherein the computer generates a predictive nowcast portion of the nowcast output, and wherein the predictive nowcast portion of the nowcast output comprises nowcast weather image of the ongoing convective object at the set of one or more future time step intervals predicting a future motion and intensity of the ongoing convective object.

15. The method of claim 1, further comprising determining intensity changes associated with each pixel of a nowcast weather image of the ongoing convective object according to a set of weather object parameters.

16. The method of claim 1, wherein the one or more weather data digital pixel images comprise satellite images and/or radar reflectivity images.

17. The method of claim 1, wherein identifying the ongoing convective object in the first weather data digital pixel image comprises grouping, by the computer, connected pixels in the first weather data digital pixel image representing an ongoing convective object.

18. The method of claim 17, wherein the first weather data digital pixel image comprises a satellite image, and wherein grouping the connected pixels representing the ongoing convective object comprises grouping connected pixels having a brightness temperature colder than a predetermined threshold parameter.

19. The method of claim 17, wherein the first weather data digital pixel image comprises a radar reflectivity image, and wherein grouping the connected pixels representing the ongoing convective object comprises grouping connected pixels indicating reflectivity larger than a predetermined reflectivity threshold.

20. A weather nowcasting system for automated modeling, recording, and predicting convective weather, the system comprising:
a convective evolution database comprising non-transitory machine-readable medium configured to store one or more convective object data records; and
a processor configured to:
receive, from one or more image data sources, one or more weather data digital pixel images for a set of time step intervals, the one or more weather data digital pixel images including at least a first weather data digital pixel image for a first time step interval;
identify an ongoing convective object in the first weather data digital pixel image based on the presence of one or more predetermined parameters that indicate the presence of a convective object;
generate a convective object data record for the ongoing convective object, the convective object data record including one or more parameters associated with the ongoing convective object at the first time step interval and at one or more time step intervals after the first time step interval;
store the convective object data record in the convective evolution database;
generate a nowcast output for the ongoing convective object based on (i) the convective object data record for the ongoing convective object and (ii) one or more convective object data records for one or more past convective objects, wherein the nowcast output is generated at least in part using a machine-learning nowcasting algorithm configured to generate a predictive nowcast of an ongoing convective object based on convective object data records for the ongoing convective object and one or more past convective objects; and
transmit the nowcast output to one or more user devices configured to display the nowcast output, wherein when displayed on the one or more user devices via a graphical user interface, the nowcast output includes a geographic map indicating a nowcast weather image of the ongoing convective object at a set of future time step intervals.

21. The weather nowcasting system of claim 20, wherein the one or more convective object data records for one or more past convective objects comprise one or more convective object data records stored in the convective evolution database.

22. The weather nowcasting system of claim 21, wherein the processor is further configured to identify the one or more convective object data records in the convective evolution database based on at least a geographic parameter or a temporal parameter, wherein geographic parameter indicates a geographic location of a convective object, and wherein a temporal parameter indicates a time of a convective object.

23. The weather nowcasting system of claim 20, wherein to store the convective object data record in the convective evolution database, the processor is further configured to:
update the machine-learning nowcasting algorithm based on the convective object data record and at least one convective object data record in the convective evolution database.

24. The weather nowcasting system of claim 20, wherein the processor is further configured to receive weather observation data from one or more data sources, wherein the processor is configured to identify the ongoing convective object based further on the weather observation data.

25. The weather nowcasting system of claim 20, wherein the processor is further configured to:
receive weather observation data related to the ongoing convective object from one or more data sources; and
store the weather observation data in the convective object data record.

26. The weather nowcasting system of claim 20, wherein the processor is further configured to receive weather observation data from one or more data sources, wherein the processor is configured to generate the nowcast output based further on the weather observation data.

27. The weather nowcasting system of claim 20, wherein the nowcast output is at least one of a machine-readable computer file and a machine-readable data stream.

28. The weather nowcasting system of claim 20, further comprising a database configured to store weather observation data and weather image data, wherein the processor is further configured to:
receive weather observation data and weather image data from one or more data sources; and
store, in the database, the weather observation data and the weather image data received from the one or more data sources.

29. The weather nowcasting system of claim 28, wherein the processor is further configured to convert the weather observation data and the weather image data received from the one or more data sources into a format compatible with the processor.

30. The weather nowcasting system of claim 28, further comprising one or more sub-databases configured to store subsets of data records stored in the database, wherein the processor is further configured to store a subset of the weather observation data and the weather image data in at least one of the one or more sub-databases based on a geographic parameter of the subset indicating a geographic location associated with the at least one sub-database and the subset.

31. The weather nowcasting system of claim 20, wherein the processor is further configured to generate the nowcast output based on one or more parameters in weather observation data and/or weather image data received from one or more data sources, the one or more parameters selected from the group comprising: object maximum reflectivity, maximum reflectivity change rate, object area, object area change rate, object coldest brightness temperature coldest brightness temperature change rate, and flash statistics.

32. The weather nowcasting system of claim 31, wherein the processor is further configured to automatically calculate parameter values for each convective object record stored in the convective evolution database during the life span of a respective convective object.

33. The weather nowcasting system of claim 20, wherein the processor is further configured to search the convective evolution database to find the one or more past convective objects with one or more parameters that match the ongoing convective object, wherein the processor is further configured to generate a predictive nowcast portion of the nowcast output, and wherein the predictive nowcast portion of the nowcast output comprises the nowcast weather image of the ongoing convective object at the set of one or more future time step intervals predicting a future motion and intensity of the ongoing convective object.

34. The weather nowcasting system of claim 20, wherein the processor is further configured to determine intensity changes associated with each pixel of a nowcast weather image of the ongoing convective object according to a set of weather object parameters.

35. The weather nowcasting system of claim 20, wherein the one or more weather data digital pixel images comprise satellite images and/or radar reflectivity images.

36. The weather nowcasting system of claim 20, wherein to identify the ongoing convective object in the first weather data digital pixel image, the processor is further configured to group connected pixels in the first weather data digital pixel image representing an ongoing convective object.

37. The weather nowcasting system of claim 36, wherein the first weather data digital pixel image comprises a satellite image, and wherein to group the connected pixels representing the ongoing convective object, the processor is further configured to group connected pixels having a brightness temperature colder than a predetermined threshold parameter.

38. The weather nowcasting system of claim 36, wherein the first weather data digital pixel image comprises a radar reflectivity image, and wherein to group the connected pixels representing the ongoing convective object, the processor is further configured to group connected pixels indicating reflectivity larger than a predetermined reflectivity threshold.

* * * * *